United States Patent
Roenning et al.

(10) Patent No.: US 9,465,526 B2
(45) Date of Patent: Oct. 11, 2016

(54) DIGITAL SLATE

(71) Applicant: Apple Inc., Cupertino, CA (US)

(72) Inventors: Jeff Roenning, Santa Cruz, CA (US);
Patrick Vasta, San Francisco, CA (US);
Douglas DeVore, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/330,298

(22) Filed: Jul. 14, 2014

(65) Prior Publication Data

US 2015/0019971 A1    Jan. 15, 2015

Related U.S. Application Data

(62) Division of application No. 12/192,986, filed on Aug. 15, 2008, now Pat. No. 8,819,014.

(51) Int. Cl.
*G06F 3/0484* (2013.01)
*G06F 17/30* (2006.01)
*H04N 9/82* (2006.01)
*G11B 27/10* (2006.01)

(52) U.S. Cl.
CPC ....... *G06F 3/0484* (2013.01); *G06F 17/30781* (2013.01); *G11B 27/105* (2013.01); *H04N 9/8205* (2013.01); *H04N 9/8244* (2013.01)

(58) Field of Classification Search
CPC .......... G06F 17/30781; G06F 3/0484; G11B 27/105; H04N 9/8205; H04N 9/8244
See application file for complete search history.

(56) References Cited

U.S. PATENT DOCUMENTS

| | | | |
|---|---|---|---|
| 7,460,601 B2 | 12/2008 | Taniguchi | |
| 8,819,014 B2 | 8/2014 | Roenning et al. | |
| 2002/0087642 A1 | 7/2002 | Wei et al. | |
| 2002/0122659 A1 | 9/2002 | McGrath et al. | |
| 2002/0131764 A1 | 9/2002 | David et al. | |
| 2003/0093790 A1 | 5/2003 | Logan et al. | |
| 2003/0195863 A1 | 10/2003 | Marsh | |
| 2004/0095474 A1* | 5/2004 | Matsufune | 348/220.1 |
| 2004/0120722 A1 | 6/2004 | Braun et al. | |
| 2004/0249861 A1 | 12/2004 | Hoshino et al. | |
| 2005/0270825 A1* | 12/2005 | Tanaka et al. | 365/154 |
| 2007/0025693 A1* | 2/2007 | Shibata et al. | 386/95 |
| 2007/0177576 A1 | 8/2007 | Johansen et al. | |
| 2008/0273862 A1* | 11/2008 | Okamoto et al. | 386/123 |
| 2009/0231459 A1 | 9/2009 | Wayne et al. | |

* cited by examiner

*Primary Examiner* — Jorge A Casanova
(74) *Attorney, Agent, or Firm* — Adeli LLP

(57) ABSTRACT

Some embodiments provide a method performed by a digital slate. The method receives input of a first set of metadata for a particular video clip from a user. The method receives a second set of metadata for the particular video clip from a camera as the camera films the particular video clip. The method embeds the first and second sets of metadata in a data storage structure. The method transmits the data structure for later use in matching the first and second sets of metadata with the particular video clip. Some embodiments display at least a portion of the stored metadata about the particular video clip in front of a camera at the start of the particular video clip.

24 Claims, 25 Drawing Sheets

DIGITAL SLATE

CLAIM OF BENEFIT TO PRIOR APPLICATIONS

This application is a divisional application of U.S. patent application Ser. No. 12/192,986, filed Aug. 15, 2008, now published as U.S. Publication 2010/0042650, which is incorporated herein by reference.

FIELD OF THE INVENTION

The invention is directed towards a digital slate. Specifically, the invention is directed towards a digital slate that is a handheld device.

BACKGROUND OF THE INVENTION

In film and video production, a slate is used to visually track information about each "take" of a film project. A take is a single attempt at filming a particular scene of the project. FIG. 1 illustrates a typical slate 100 that is used in the film and television industry. The slate 100 includes of a dry erase board 105 and a "clapper" 110. The dry erase board portion 105 of the slate 100 includes fields for a project title (in FIG. 1, the project title is "Hot Baby"), roll (camera roll), scene number, take number, director, cameraman, and date of filming. The slate 100 also includes options "MOS" (filmed without sound) and "DAY" or "NITE" referring to when the take is being filmed.

When filming numerous takes, as is typically done on a set, a slate must be written on with a dry erase marker, then erased and rewritten for each new take. At the start of a take, someone (usually the script supervisor) holds the slate in front of the camera filming the take so that the pertinent information is recorded. The script supervisor then closes the clapper 110 in order to "mark" the take. This clear clapping sound allows sound recorded separately to be synchronized with the video in post production.

In addition to filling out the slate, the script supervisor also fills out a paper log including all of the information on the slate, as well as other information such as director's comments and what type of shot is being filmed with the present take (e.g., a wide shot, a close-up, etc.). A second log sheet is filled out by the camera department (e.g., by the assistant cameraperson) with the scene and take number, the camera roll, and camera details such as the lens used for the take and any issues with the take (e.g., the camera was out of focus). The sound recordist must fill out a third log sheet with the scene and take number, the sound roll, the microphone used for the take, and any sound details (e.g., if a plane flew overhead during the take).

The above three log sheets are collected for each take and must be hand-entered into either a spreadsheet that is fed into a non-linear video editor ("NLE") or hand-entered into the NLE itself. Often there will be discrepancies between the three log sheets due to an error by one or more of the script supervisor, assistant cameraperson, and sound recordist, which must be resolved. Furthermore, the data entered into the NLE must be manually matched with the video and sound content it describes. Between rewriting all the data on a separate log sheet for each take, hand-entering the data into the NLE and matching it with the correct content, and resolving errors, the data transfer is an extremely tedious process. Accordingly, there is a need for a slate that is digital and easily portable and that eliminates error and hand entry of data.

In addition to the standard data used for all takes, effects shots require additional data to be recorded. Specifically, effects shots require the measurement of the height of the camera off the ground and the angle of the camera relative to the ground. Measuring the camera angle is generally done with a plumb ball device requiring estimation of the angle by a human eye. This is both tedious and lacking in accuracy. Therefore, there is a need for a more automated and accurate measurement of the camera angle for effects shots.

SUMMARY OF THE INVENTION

Some embodiments of the invention provide a novel method that uses a handheld device for displaying, capturing, storing, and transmitting metadata pertaining to a video clip. A video clip in some embodiments is a particular take of (i.e., a single attempt at filming) a particular scene in a film (e.g., movie), show (e.g., television show), or other video project. In some embodiments, the handheld device is a handheld multimedia device (e.g., a media player, a phone, a phone/media player, etc.), while in other embodiments, the handheld device is any type of digital device.

In some embodiments, the handheld device is a device that serves as a "digital slate." A digital slate, in some embodiments, is a digital device that serves the purpose of a traditional slate by displaying metadata about a particular video clip (e.g., a particular take) in front of a camera that is about to film the video clip. Some embodiments display a sequence of metadata about the particular video clip on a screen. For example, when the video clip is a particular take, some embodiments display metadata, such as the take and scene number, the project title, the director and cameraperson for the project, etc. While this metadata is displayed by the digital slate, the digital slate can be held in front of the camera as the camera begins filming the particular video clip so that the video clip includes video of the metadata being displayed.

Some embodiments of the digital slate also provide a visual and/or auditory digital synchronization ("sync") mark. With the digital sync mark, the digital slate performs the function of closing the clapper on a traditional slate. The digital sync mark is used to synchronize audio and video during post-production. The digital sync mark of some embodiments displays a countdown, followed by two bars clapping together along with a distinctive sound. In some embodiments, the digital slate displays the "clapping" of the two bars by using a particular number (e.g., 3) of frames, in which each frame shows the position of the two bars at a different instance in time.

Some embodiments of the digital slate receive user input of metadata through a touchscreen. In some embodiments, the digital slate includes a nested hierarchy of menus that is designed to minimize the amount of typing a user has to perform in order to input the metadata, as typing on a handheld device can be a tedious process. The metadata can be received before, during, and/or after the filming of the video clip to which it pertains. Metadata received from user input can include a take number and scene number for the video clip, the director of a project with which the video clip is associated, as well as a variety of other information. In some embodiments, the metadata displayed by the digital slate includes metadata that is input from the user.

In some embodiments, the digital slate includes tilt-detection circuitry such as an accelerometer. Such circuitry enables the device to determine the angle at which it is held. Accordingly, in some embodiments, a user can place the device flat on top of a camera and thereby accurately determine the angle of the camera. Some embodiments store this angle (automatically, or manually through user input) as a piece of metadata associated with the particular video clip filmed by the camera.

Some embodiments capture metadata about a video clip directly from a camera as the camera films the video clip. This information is captured via a short-range wireless connection (e.g., Bluetooth) or through a wired connection (e.g., USB) from the camera to the device. The metadata captured directly from the camera is timecode for the video clip in some embodiments (e.g., when the video clip is stored on a digital tape). Some embodiments only capture and store the timecode at the start of the video clip and at the end of the video clip. In some embodiments, the metadata captured directly from the camera is a name of a file for the video clip when the video clip is stored directly on a hard disk in the camera.

Some embodiments embed the metadata received from a user and/or captured from a camera in a data storage structure. The data storage structure of some embodiments is a generic storage structure that can be read by any editing program. For example, in some embodiments, the data storage structure is an XML file. Some embodiments store metadata for numerous video clips in one data storage structure, while other embodiments use a separate data storage structure to store metadata for each video clip.

In some embodiments, the data storage structure storing the metadata is transmitted from the device. For example, in some embodiments, a user can e-mail the storage structure to either another user or themselves. The data storage structure can be imported into a video editing tool (e.g., a non-linear editor) in some embodiments. Some embodiments receive both the storage structure with the metadata for a set of video clips, as well as the video clips themselves. The editing tool automatically merges the video clips with the associated metadata in some embodiments. In some embodiments, the data storage structure is an XML file, and the editing tool includes an XML parser that parses the XML to read the metadata. If the metadata includes timecode information for the video clips (e.g., when importing video clips recorded to a digital tape), the editing tool of some embodiments uses the timecode to associate the video clips with the metadata. If the metadata includes file names for the video clips (e.g., when importing video clips recorded to a hard drive), the editing tool uses the file names to associate the video clips with the metadata.

Some embodiments of the invention utilize multiple digital slates that share metadata about a video clip with each other via wireless communication. For instance, in some embodiments, metadata is input into a master device which populates other slave devices. The master device might be used by a script supervisor of a film project, while the other devices would be used by a cameraperson and a sound recordist of a project. Similarly, in some embodiments, the users of the slave devices can update the metadata and send this to the master device. For example, the cameraperson can provide updates about camera-related information through one of the slave devices.

Although the invention is described above and below as having certain features, not all features are present in all embodiments. For instance, some embodiments might not use a handheld device as a digital slate (i.e., to display a sequence of metadata) but instead use another type of device to capture metadata and merge the captured metadata with video clips. Similarly, in some embodiments, the digital slate might display metadata that is not received from a user, but is instead received from a camera or is generated by the digital slate itself.

BRIEF DESCRIPTION OF THE DRAWINGS

The novel features of the invention are set forth in the appended claims. However, for purpose of explanation, several embodiments of the invention are set forth in the following figures.

FIGS. 17-19A and 19B illustrate a first set of menus for some embodiments of a digital slate.

DETAILED DESCRIPTION OF THE INVENTION

Figure 1:
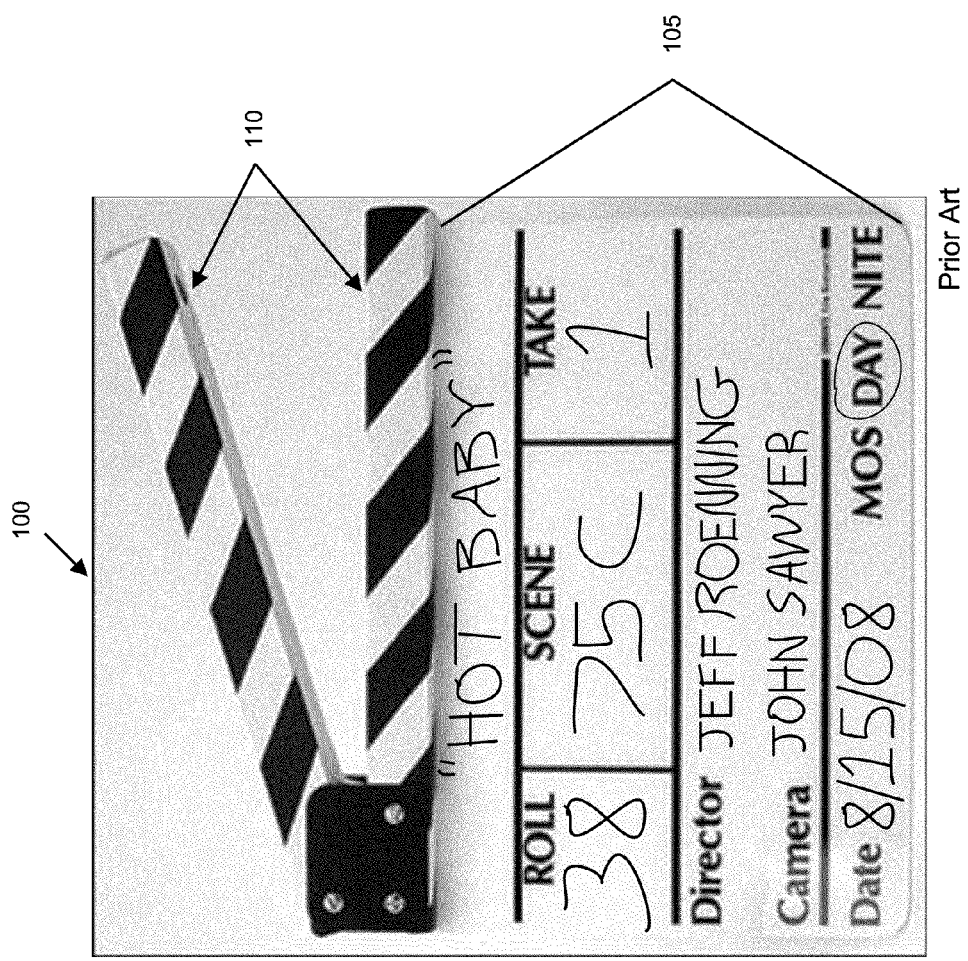
FIG. 1 illustrates a traditional slate used in the film and television industry.

In the following description, numerous details are set forth for purpose of explanation. However, one of ordinary skill in the art will realize that the invention may be practiced without the use of these specific details. For instance, the techniques described below are described with relation to certain handheld devices, but other embodiments may use other devices while still embodying the current invention.

I. Overview

Some embodiments of the invention provide a novel method that uses a handheld device for displaying, capturing, storing, and transmitting metadata pertaining to a video clip. A video clip in some embodiments is a particular take of (i.e., a single attempt at filming) a particular scene in a film (e.g., movie), show (e.g., television show), or other video project. In some embodiments, the handheld device is a handheld multimedia device (e.g., a media player, a phone, a phone/media player, etc.), while in other embodiments, the handheld device is any type of digital device.

In some embodiments, the handheld device is a device that serves as a "digital slate." A digital slate, in some embodiments, is a digital device that serves the purpose of a traditional slate by displaying metadata about a particular video clip (e.g., a particular take) in front of a camera that is about to film the video clip. Some embodiments display a sequence of metadata about the particular video clip on a screen. For example, when the video clip is a particular take, some embodiments display metadata, such as the take and scene number, the project title, the director and cameraperson for the project, etc. While this metadata is displayed by the digital slate, the digital slate can be held in front of the camera as the camera begins filming the particular video clip so that the video clip includes video of the metadata being displayed.

Some embodiments of the digital slate also provide a visual and/or auditory digital synchronization ("sync") mark. With the digital sync mark, the digital slate performs the function of closing the clapper on a traditional slate. The digital sync mark is used to synchronize audio and video during post-production. The digital sync mark of some embodiments displays a countdown, followed by two bars clapping together along with a distinctive sound. In some embodiments, the digital slate displays the "clapping" of the two bars by using a particular number (e.g., 3) of frames, in which each frame shows the position of the two bars at a different instance in time.

Some embodiments of the digital slate receive user input of metadata through a touchscreen. In some embodiments, the digital slate includes a nested hierarchy of menus that is designed to minimize the amount of typing a user has to perform in order to input the metadata, as typing on a handheld device can be a tedious process. The metadata can be received before, during, and/or after the filming of the video clip to which it pertains. Metadata received from user input can include a take number and scene number for the video clip, the director of a project with which the video clip is associated, as well as a variety of other information. In some embodiments, the metadata displayed by the digital slate includes metadata that is input from the user.

In some embodiments, the digital slate includes tilt-detection circuitry such as an accelerometer. Such circuitry enables the device to determine the angle at which it is held. Accordingly, in some embodiments, a user can place the device flat on top of a camera and thereby accurately determine the angle of the camera. Some embodiments store this angle (automatically, or manually through user input) as a piece of metadata associated with the particular video clip filmed by the camera.

Some embodiments capture metadata about a video clip directly from a camera as the camera films the video clip. This information is captured via a short-range wireless connection (e.g., Bluetooth) or through a wired connection (e.g., USB) from the camera to the device. The metadata captured directly from the camera is timecode for the video clip in some embodiments (e.g., when the video clip is stored on a digital tape). Some embodiments only capture and store the timecode at the start of the video clip and at the end of the video clip. In some embodiments, the metadata captured directly from the camera is a name of a file for the video clip when the video clip is stored directly on a hard disk in the camera.

Some embodiments embed the metadata received from a user and/or captured from a camera in a data storage structure. The data storage structure of some embodiments is a generic storage structure that can be read by any editing program. For example, in some embodiments, the data storage structure is an XML file. Some embodiments store metadata for numerous video clips in one data storage structure, while other embodiments use a separate data storage structure to store metadata for each video clip.

In some embodiments, the data storage structure storing the metadata is transmitted from the device. For example, in some embodiments, a user can e-mail the storage structure to either another user or themselves. The data storage structure can be imported into a video editing tool (e.g., a non-linear editor) in some embodiments. Some embodiments receive both the storage structure with the metadata for a set of video clips, as well as the video clips themselves. The editing tool automatically merges the video clips with the associated metadata in some embodiments. In some embodiments, the data storage structure is an XML file, and the editing tool includes an XML parser that parses the XML to read the metadata. If the metadata includes timecode information for the video clips (e.g., when importing video clips recorded to a digital tape), the editing tool of some embodiments uses the timecode to associate the video clips with the metadata. If the metadata includes file names for the video clips (e.g., when importing video clips recorded to a hard drive), the editing tool uses the file names to associate the video clips with the metadata.

Some embodiments of the invention utilize multiple digital slates that share metadata about a video clip with each other via wireless communication. For instance, in some embodiments, metadata is input into a master device which populates other slave devices. The master device might be used by a script supervisor of a film project, while the other devices would be used by a cameraperson and a sound recordist of a project. Similarly, in some embodiments, the users of the slave devices can update the metadata and send this to the master device. For example, the cameraperson can provide updates about camera-related information through one of the slave devices.

Figure 2:
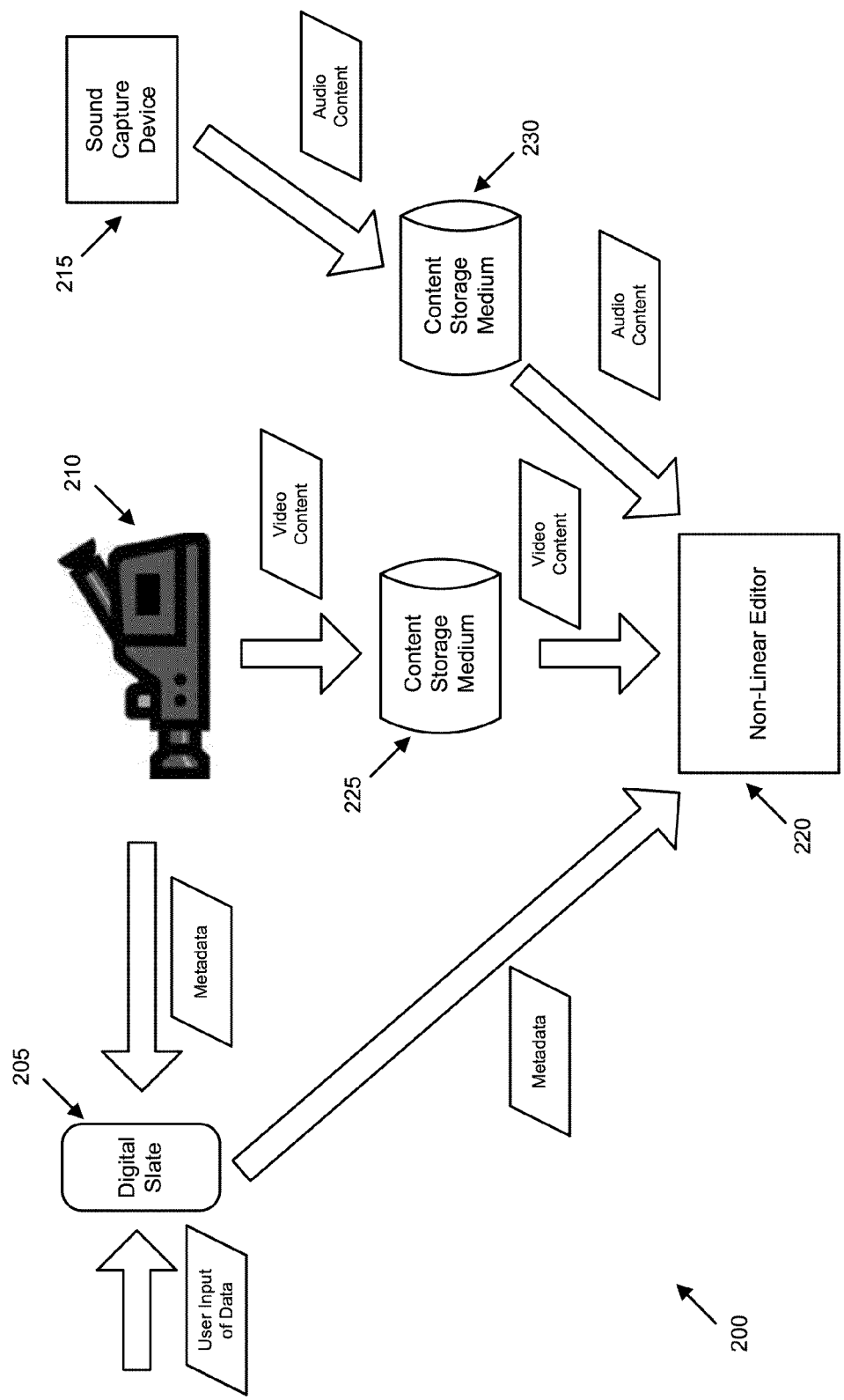
FIG. 2 conceptually illustrates a system of some embodiments that includes a digital slate.

FIG. 2 conceptually illustrates a system 200 of some embodiments that includes a digital slate. FIG. 2 illustrates a digital slate 205, a video camera 210, a sound capture device 215 (e.g., a boom microphone), and a non-linear video editor 220. The video camera has an associated content storage medium 225, and the sound capture device has an associated content storage medium 230. In some embodiments, the storage media 225 and 230 are the same storage medium (e.g., the same tape, hard disk, solid-state memory, etc.).

In some embodiments, the digital slate 205 is a handheld device (e.g., an iPhone, iPod, or other such device). The digital slate 205 includes a touchscreen, a speaker, and/or tilt-detection circuitry in some embodiments. In some embodiments, the digital slate 205 displays a sequence of metadata as the digital slate 205 is held in front of the camera 210 while the camera 210 begins filming a video clip, so that the video content of the video clip includes the displayed metadata.

The digital slate 205 receives user input of metadata. In some embodiments, this metadata is received through a user's use of the touchscreen on the digital slate 205. As mentioned above, this metadata is information about a particular take of a scene in a film (e.g., movie), show (e.g., television show), or other video project. The metadata can be entered by the user before, during, and/or after the filming of the particular take.

Some embodiments include multiple digital slates 205. The multiple digital slates 205 can communicate with each wirelessly in some embodiments to transfer metadata. For instance, metadata input to one slate by a user can be immediately transmitted to the other slates.

The digital slate also receives metadata from the video camera 210. In some embodiments, the metadata from the video camera 210 is data that identifies a particular take. For example, in some embodiments, the metadata is timecode data for the particular take (e.g., the start and end time of the take), a name of a file that stores the video content of the take on a hard disk, etc.

The video camera 210 also creates video content and stores the video content in a content storage medium 225. The video content includes one or more takes of one or more scenes in some embodiments.

In some embodiments, the content storage medium 225 is digital tape. When the content storage medium 225 is digital tape, the metadata that the video camera 210 transmits to the digital slate 205 includes timecode data in some embodiments. In some embodiments, the content storage medium 225 is a hard disk. When the content storage medium 225 is a hard disk, the metadata that the video camera 210 transmits to the digital slate includes a file name in some embodiments. Some embodiments store video content on other content storage media.

Sound capture device 215 (1) captures audio content while the video camera is capturing video content, and (2) stores the audio content in a content storage medium 230. In some embodiments, the sound capture device is part of the video camera. In some such embodiments, the content storage media 225 and 230 are the same content storage medium. The sound capture device is a microphone separate from the video camera in some embodiments.

Non-linear editor ("NLE") 220 receives metadata from the digital slate 205. The NLE 220 includes a video editing tool in some embodiments. Some embodiments of the NLE 220 include an XML parser. In some embodiments, the digital slate embeds the metadata in a data storage structure (e.g., an XML file). The data storage structure is transmitted from the digital slate 205 via e-mail in some embodiments. The recipient of the e-mail can then load the data storage structure with the metadata into the NLE 220.

The NLE 220 also receives the video and/or audio content. In some embodiments, the NLE 220 automatically merges the video and/or audio content with the metadata such that the metadata that describes a particular take is matched with the content for that particular take. The NLE 220 uses the timecode or file name received from the video camera to perform the matching process in some embodiments. In some embodiments, the NLE 220 automatically imports the metadata and displays this information for a user to associate with imported video content.

II. Digital Slate

Figure 3:
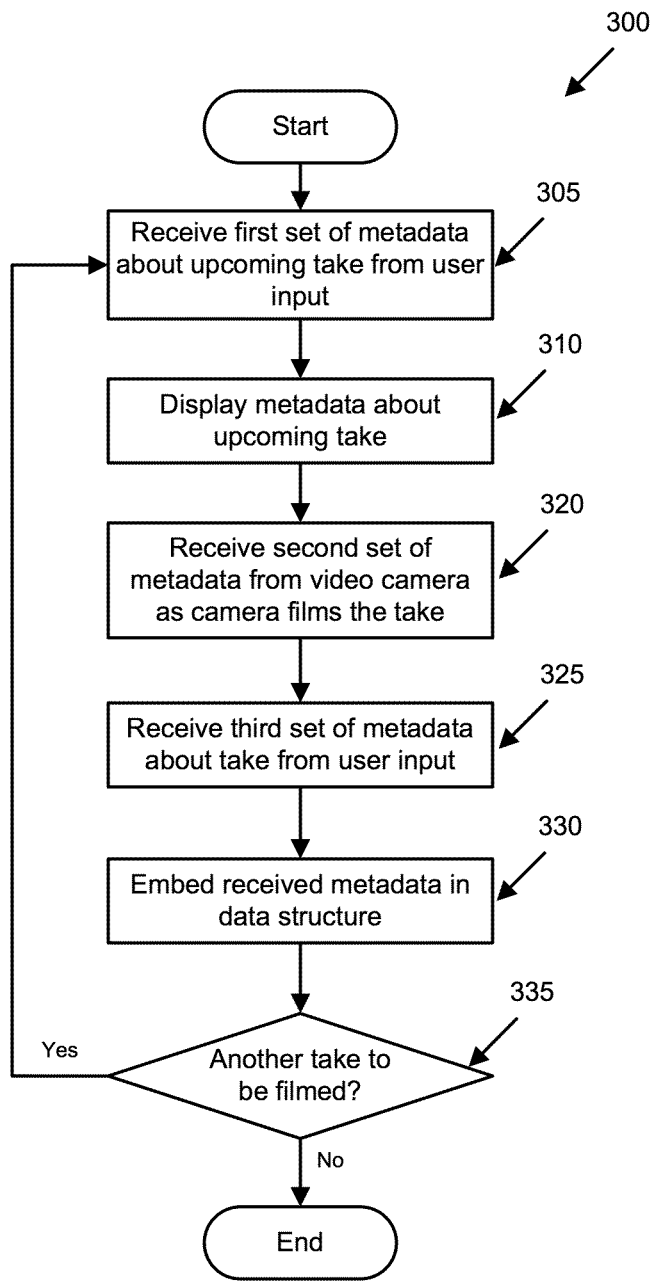
FIG. 3 conceptually illustrates a process performed by some embodiments of a digital slate for capturing, displaying, storing, and transmitting metadata.

Some embodiments of the digital slate display, capture, store, and transmit metadata. FIG. 3 conceptually illustrates an exemplary process 300 performed by some embodiments of the digital slate to capture, display, store, and transmit metadata pertaining to a particular take of a particular scene from a film project. The process begins at 300 when the digital slate receives a first set of metadata from a user about an upcoming take. The first set of metadata includes information such as the take number, the scene associated with the take, the project associated with the take, the director of the project, other camera and sound information, etc. Some embodiments receive this input through a nested hierarchy of touchscreen menus that attempt to minimize the amount of typing required.

After receiving the first set of metadata, some embodiments display (at 310) the first set of metadata on a screen of the digital slate. In some embodiments, the metadata is displayed as a user holds the digital slate in front of a camera that is starting to film the upcoming take so that the metadata (take number, scene number, project title, etc.) is recorded by the camera. Some embodiments also provide a digital synchronization mark before, during, or after displaying the metadata. The digital synchronization mark of some embodiments is used to synchronize audio and video, and is described further below in Subsection A of this Section.

After displaying the metadata, the process 300 receives (at 315) a second set of metadata from the camera as the camera films the take. In some embodiments, the second set of metadata is timecodes for the take (e.g., when the take is recorded on a digital tape). Some embodiments receive only the starting and ending timecode for the take. Other embodiments receive a file name for the take when the take is stored as a file on a hard drive. The second set of metadata is received from the camera via a Bluetooth or other short-range wireless connection in some embodiments. Some embodiments receive the metadata from the camera via a wired connection to the camera.

Next, at 320, the digital slate receives additional metadata about the take from user input. In some embodiments, this metadata is received after the take is finished filming, while in some embodiments the information can be input during the course of the take and after the take is finished. This metadata includes information about the take such as director's comments about the take, sound or camera notes (e.g., if an airplane flew over the set during filming), and whether the take should be classified as a good or bad take. The metadata received at 320 is input through a nested hierarchy of touchscreen menus in some embodiments.

After receiving all of the metadata for a particular take, the process 300 embeds (at 325) the received metadata in a data storage structure. The data storage structure stores the timecode or other identifying information (e.g., file name) for a take along with other metadata about the take that was received from user input. In some embodiments, the data storage structure is an XML file.

The process 300 then determines (at 330) whether another take is going to be filmed. In some embodiments, this information is received from a user in response to a prompt asking if another take will be filmed. If another take is going to be filmed, the process returns to 305 and repeats 305 through 325 for the new take. If no more takes are going to be filmed, then the process ends. In some embodiments, the data structure can then be transmitted (e.g., via email) to a user (either the same user that input the data, or a different user).

Some embodiments perform variations on the process 300. For example, in some embodiments, the second set of metadata is received before and/or during the display of the metadata. When embedding the received metadata in a data storage structure, some embodiments use a single storage structure for all of the metadata for many takes, whereas some other embodiments use one storage structure per take.

A. Digital Slate Display

In some embodiments, the digital slate scrolls through a set of metadata, displaying each piece of metadata in the set on the screen. The digital slate is held in front of a camera as the camera begins to film a take. The metadata displayed by the digital slate in some embodiments is metadata corresponding to a particular take about to be filmed. The metadata is stored in the digital slate. In some embodiments, the displayed metadata is a portion of the stored metadata about the particular take, while in other embodiments the digital slate displays all the stored metadata about the particular take.

FIGS. 4-13 illustrate the sequence of metadata, as well as a digital synchronization mark, displayed by a digital slate 400 of some embodiments. Other embodiments display different pieces of metadata than those shown in FIGS. 4-13, or display the same information in a different order. The digital slate 400 displays the metadata as shown in FIGS. 4-13 while held in front of a camera in some embodiments.

Figure 4:
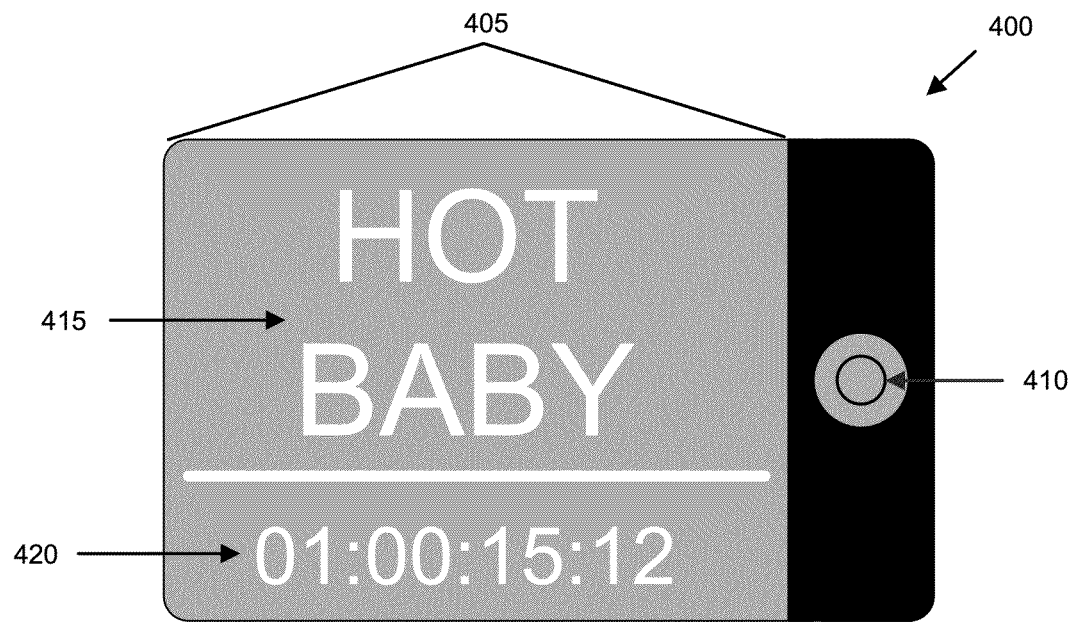
FIGS. 4-16 illustrate the display of a sequence of metadata and a digital synchronization mark by a digital slate of some embodiments.

FIG. 4 illustrates the first frame in the digital slate sequence of the shown embodiments. In some embodiments, the sequence is initiated by a user. Digital slate 400 includes screen 405 and user button 410. Other digital slates have different configurations. In this figure, screen 405 is displaying project 415 and timecode 420. Project 415 illustrates that the particular take about to be filmed is a take for a scene that is part of the project titled "Hot Baby."

The timecode 420 at the bottom of the screen is a timecode that is output by a camera that is in communication with the digital slate. The camera outputting the timecode is also the camera filming the digital slate in some embodiments. The timecode 420 is shown in hours, minutes, seconds, and hundredths of a second. Thus, in FIG. 4 the timecode is at one hour and 15.12 seconds.

Figure 5:

FIG. 5 illustrates the second frame in the shown digital slate sequence. In FIG. 5, the digital slate 400 is displaying director name 515 and timecode 420 (timecode 420 appears in most of the frames in the digital slate sequence of the depicted embodiment, and will not be discussed for every frame).

Figure 6:
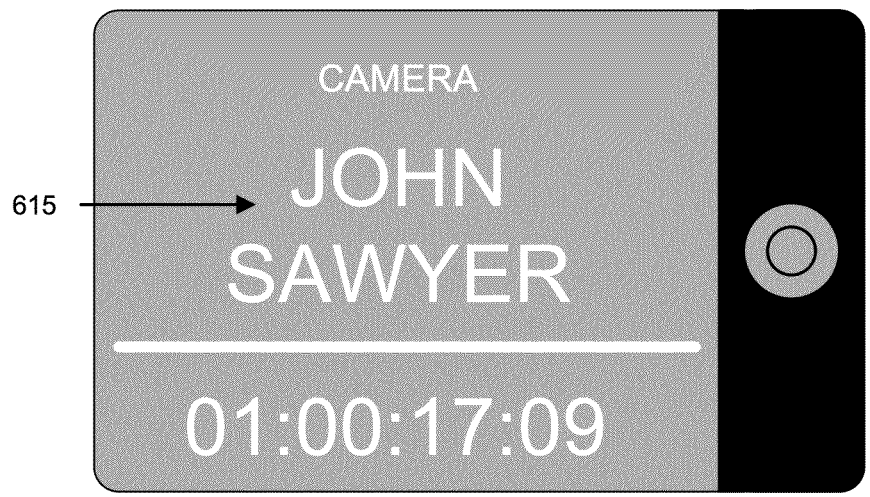
Figure 7:
Figure 8:
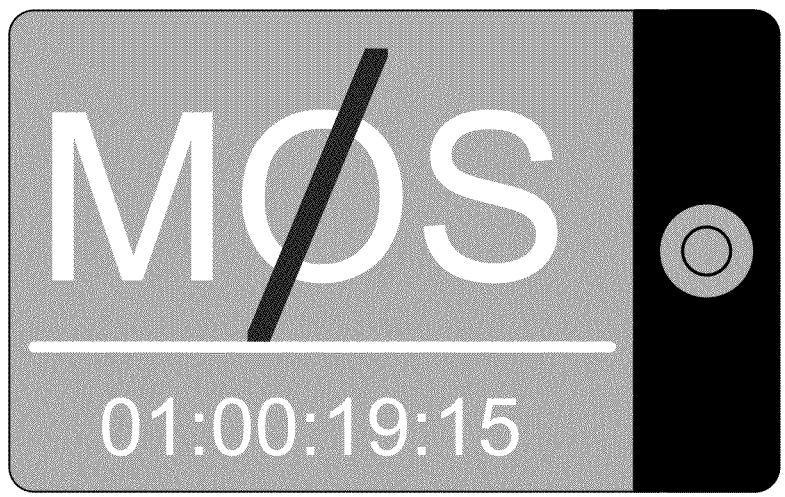
Figure 9:
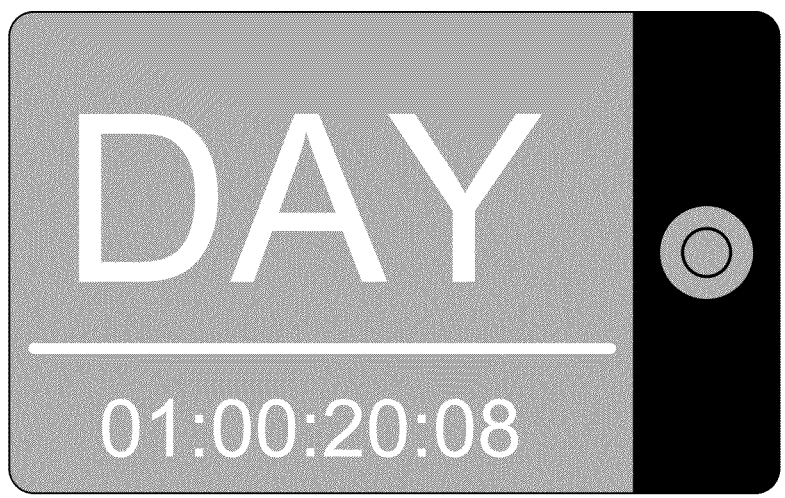
Figure 10:
Figure 11:
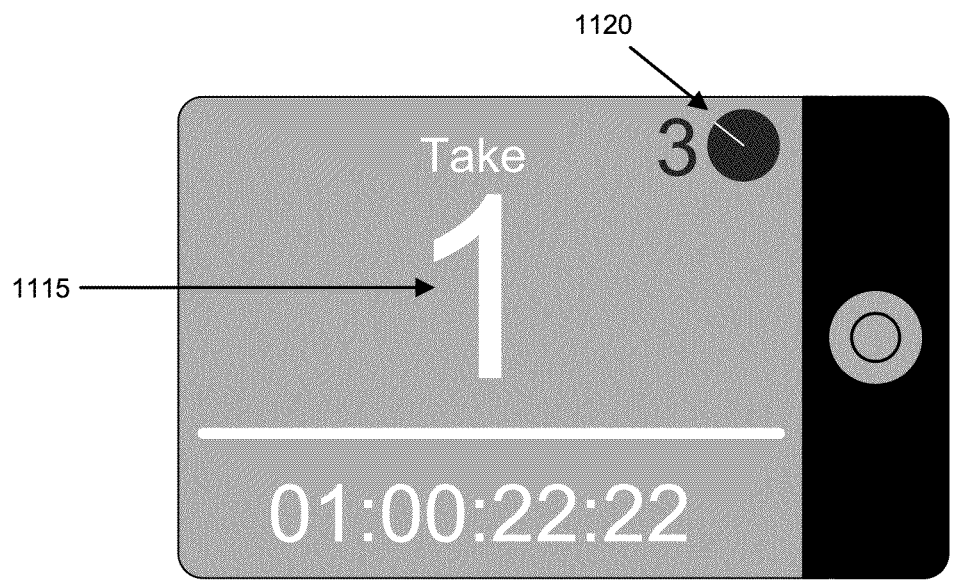

The sequence continues by displaying various metadata about the upcoming take. FIG. 6 illustrates the cameraperson 615, and FIG. 7 illustrates the date 715. FIG. 8 illustrates the digital slate displaying "MOS" with a slash through it, indicating that the take is being filmed without sound. FIG. 9 illustrates the digital slate displaying that the take is being filmed during the day. FIGS. 10 and 11 illustrate the scene number 1015 and take number 1115, indicating that the upcoming take is the first take for Scene 75C of "Hot Baby." In the depicted embodiment, each displayed frame appears for one second, and accordingly the timecode 1020 is approximately one second later in each subsequent frame.

Figure 12:
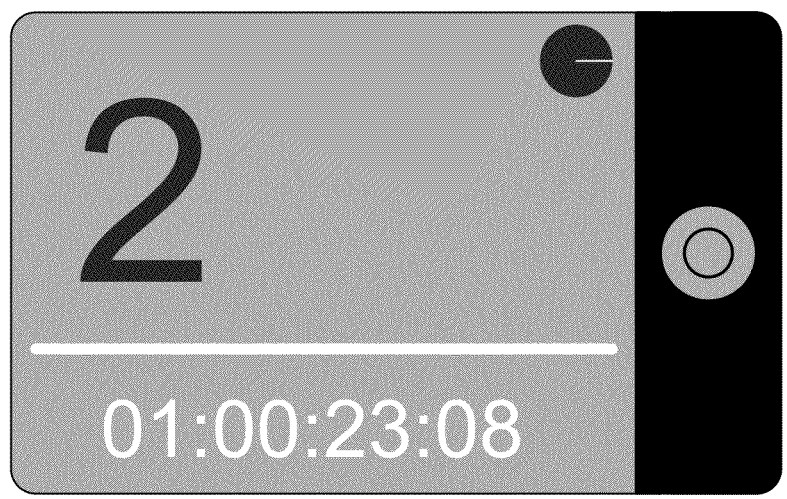
Figure 13:
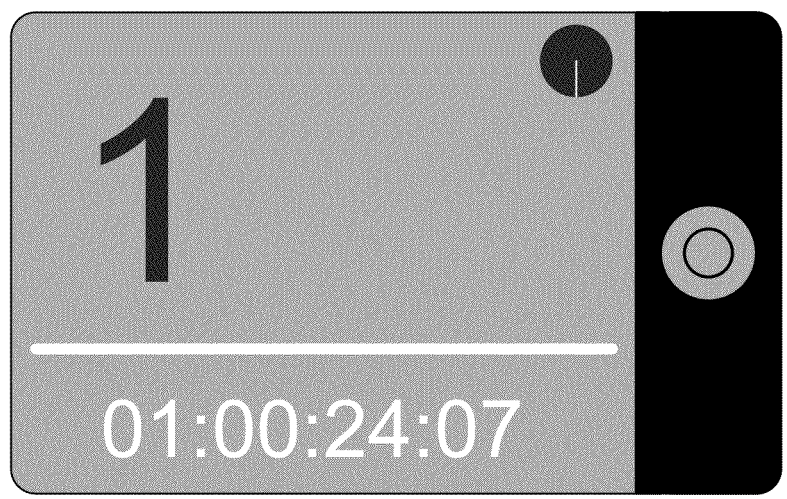

FIG. 11 also illustrates the countdown 1120. Countdown 1120 is a countdown to a digital synchronization ("sync") mark of some embodiments, which is described below. At the point of FIG. 11, there are three seconds until the digital sync mark. FIGS. 12 and 13 illustrate the continuation of the countdown to the digital sync mark. These figures have an off-centered, dark, "2" and "1" illustrating the countdown to the digital sync mark.

In some embodiments, the display of metadata by the digital slate ends with a digital sync mark. The digital sync mark is used to synchronize audio with video in post-production. The digital sync mark consists of three frames displayed by the digital slate in some embodiments. In some embodiments, each of these screens is displayed for one frame of video (i.e., 1/30 of a second), and the digital slate produces a clear sound as the third frame displays. The timing of the sound and the third digital sync mark frame enable easy synchronization of the audio and video.

Figure 14:
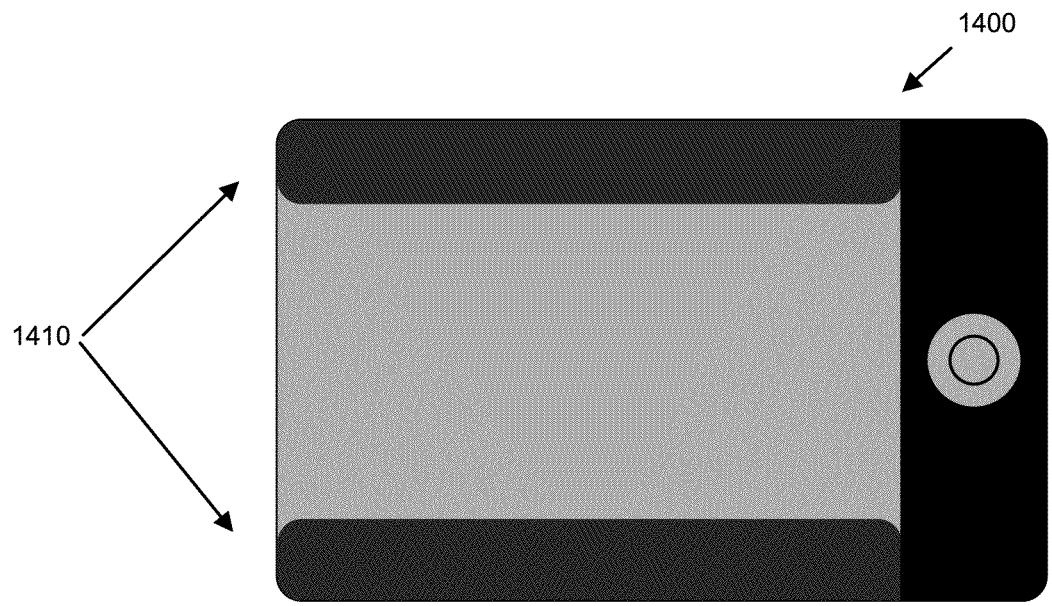
Figure 15:
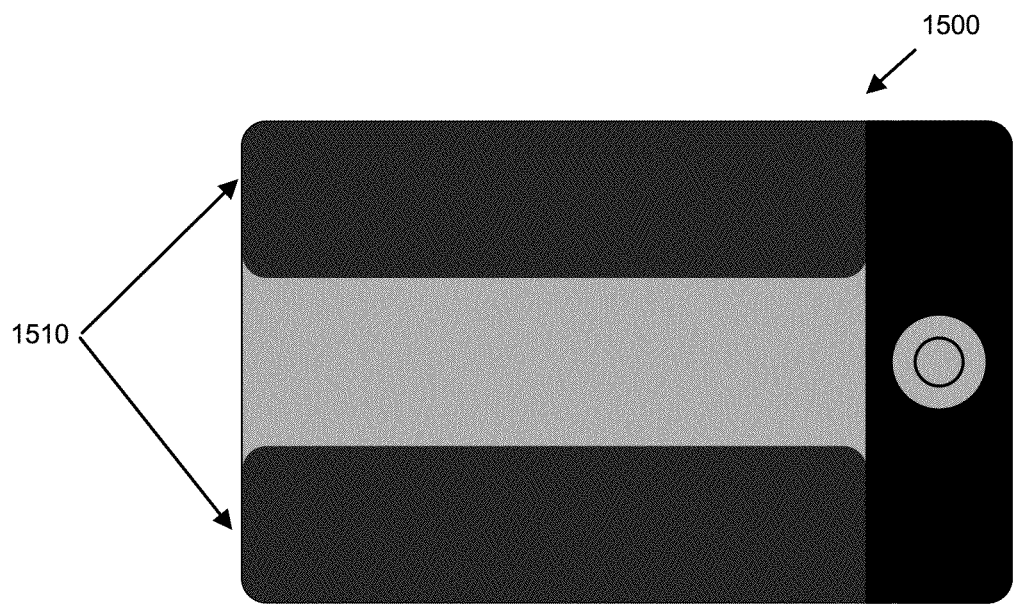
Figure 16:
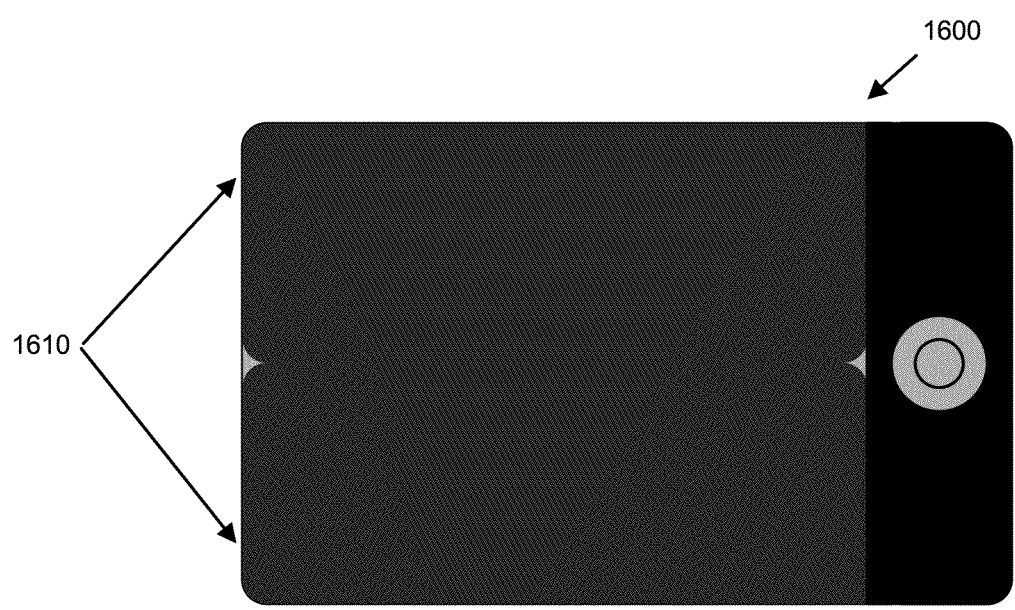

FIGS. 14-16 illustrate one embodiment of the digital sync mark. In these figures, the timecode 420 has disappeared from the screen 405. FIG. 14 illustrates a screen 1400 with two dark blocks 1410. In the depicted embodiment, these dark blocks 1410 simulate the clapper of a traditional slate. In some embodiments, the blocks 1410 have different designs (e.g., some embodiments show the traditional black and white slashes shown on the clapper 110, or show red blocks). In FIG. 14, the first of the digital sync mark frames, the blocks are approximately one-third of the way to the middle.

FIG. 15 illustrates a second screen 1500 of some embodiments of the digital sync mark. In some embodiments, the screen 1500 is displayed one video frame (e.g., 1/30 of one second) after the screen 1400. Screen 1500 includes blocks 1510 that are two-thirds of the way to the middle of the screen.

Finally, FIG. 16 illustrates the third screen 1600 of the digital sync mark of some embodiments. In some embodiments, the screen 1600 is displayed one video frame (e.g., 1/30 of a one second) after the screen 1500. Screen 1600 includes blocks 1610 that are just touching at the center of the screen (similar to the two parts of a clapper coming together). As the digital slate displays screen 1600, in some embodiments the digital slate also emits a noise (e.g., a beep, a clapping sound, etc.) that is used to synchronize audio with video in post-production by lining the sound up to the third frame of the sync mark.

As mentioned above, some embodiments of the digital slate display only some of the metadata shown in FIGS. 4-13. Other embodiments display metadata not shown in the above figures (e.g., the camera roll). Some embodiments display the metadata in a different order. For example, some embodiments display the scene and take information up front, rather than just prior to the digital sync mark.

B. Configuring the Digital Slate

Some embodiments of the digital slate receive the input of metadata for a video clip from a user. In some embodiments, the metadata is input through a touchscreen. The metadata is metadata for a particular take of a particular scene of a film in some embodiments. In some embodiments, the metadata received from a user is the metadata displayed for a camera by the digital slate, as illustrated in FIGS. 4-13.

In some embodiments, the digital slate is set up so as to minimize the amount of typing a user must do in order to input the metadata. Typing on a touchscreen can be a tedious process at times. As such, the digital slate input screens (e.g., menus) are set up in some embodiments so that most information can be input by selecting buttons rather than typing out words. Some embodiments use a nested hierarchy of touchscreen selections for inputting metadata, wherein a first selection of an option from a touchscreen menu causes the display of a second touchscreen menu with multiple options.

Figure 17:
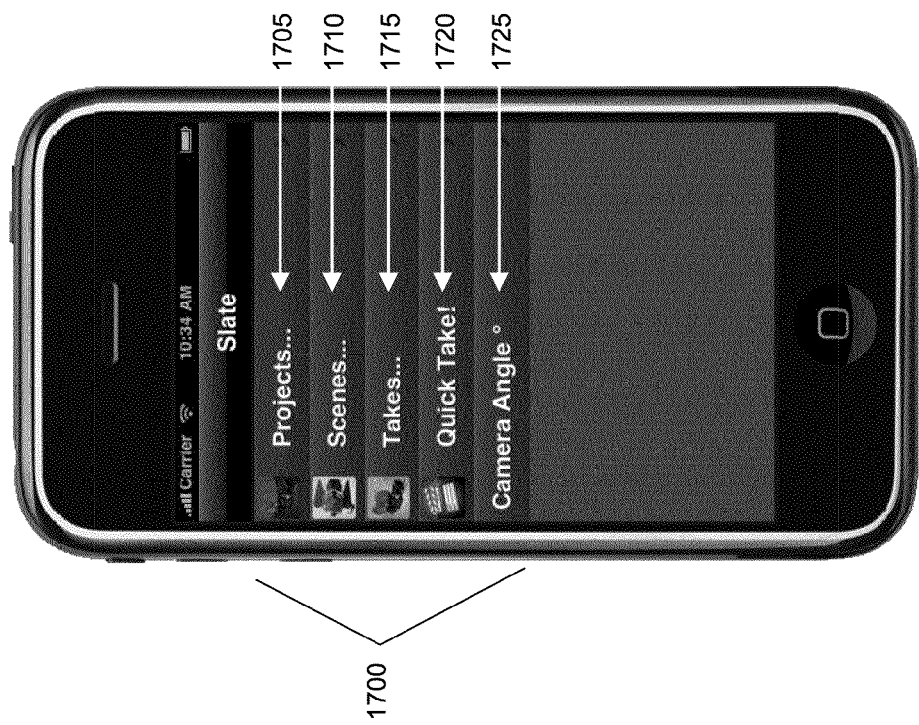

FIG. 17 illustrates an initial menu 1700 of some embodiments that has options Projects 1705, Scenes 1710, Takes 1715, Quick Take 1720, and Camera Angle 1725. The projects menu of some embodiments accessed by choosing the option 1705 allows a user to choose a current project or enter information about a new project. A project, in some embodiments, is a film, episode of a television show, etc. Entering information about a new project involves typing in some embodiments because a user must input a title, director's name, etc. However, this information need only be entered once for the project. In some embodiments, a user can edit the project information later if the initially entered information changes or is determined to be wrong.

The scenes menu of some embodiments accessed by choosing the option 1710 allows a user to choose between different scenes of a project, or enter a new scene for the project. Some embodiments also display the scenes menu after a project is selected via the above-described projects menu. Much information about a new scene can be entered via menu options rather than typing. For example, the type of shot being filmed for a particular scene (e.g., wide shot, close-up, etc.) can be selected by the user from a variety of options.

Figure 18:
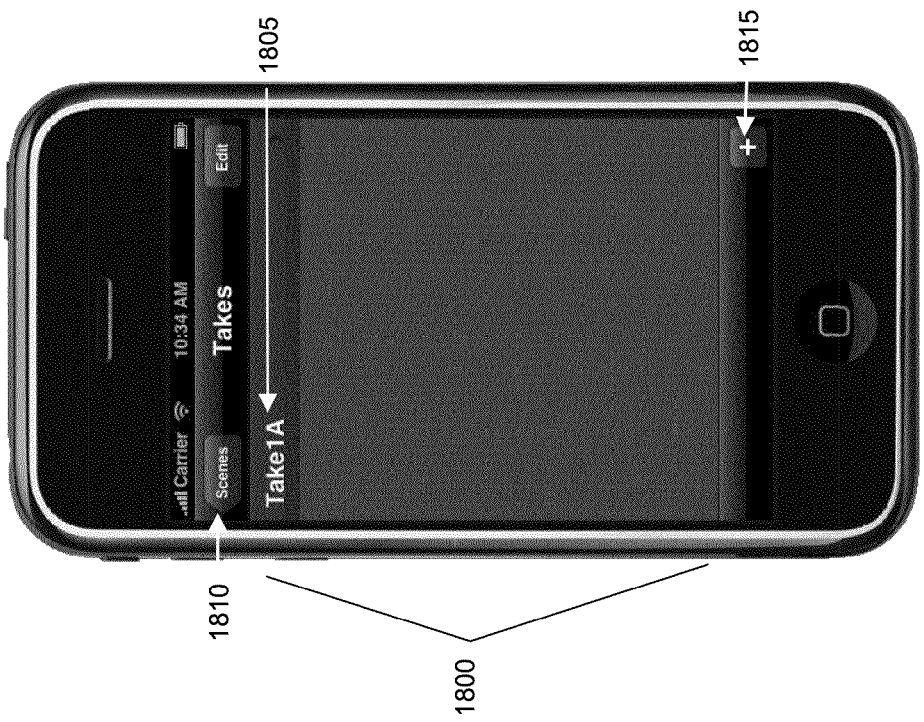

The takes menu of some embodiments accessed by choosing the option 1715 allows a user to select previous takes for a scene or to create a new take for the scene. Some embodiments also display the takes menu for a particular scene after the scene is selected via the above-described scenes menu. FIG. 18 illustrates a takes menu 1800 of some embodiments. The menu 1800 only has one take 1805 (named Take1A). The takes menu 1800 also includes a button 1810 that takes a user back to the scenes menu. At the bottom of the takes menu 1800 is new take button 1815 that allows a user to enter information about a new take for a particular scene. Some embodiments of the takes menu also display the scene and/or project with which the listed takes are associated.

Figure 19B:
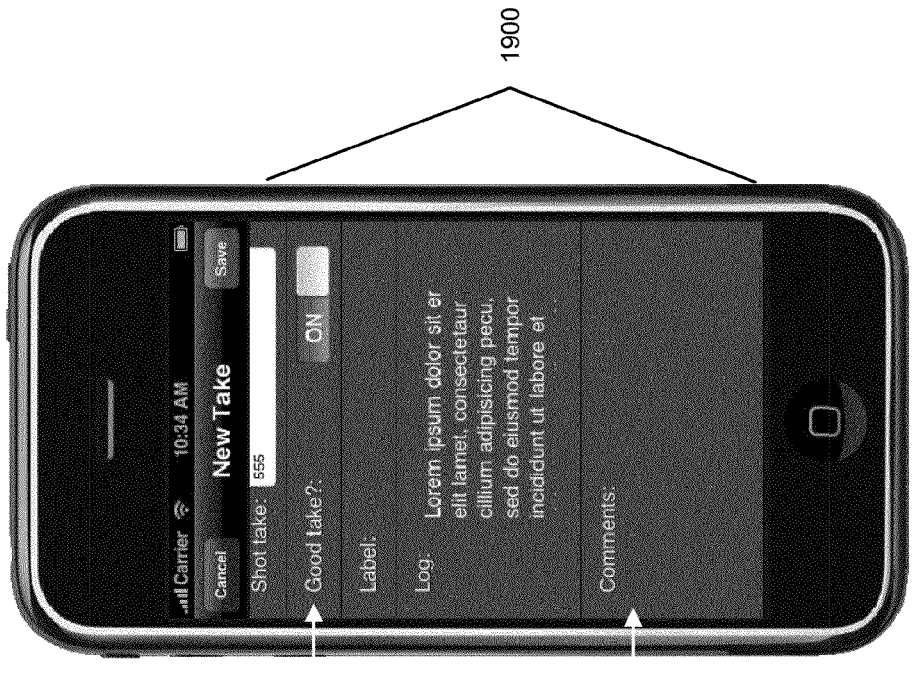
Figure 19A:
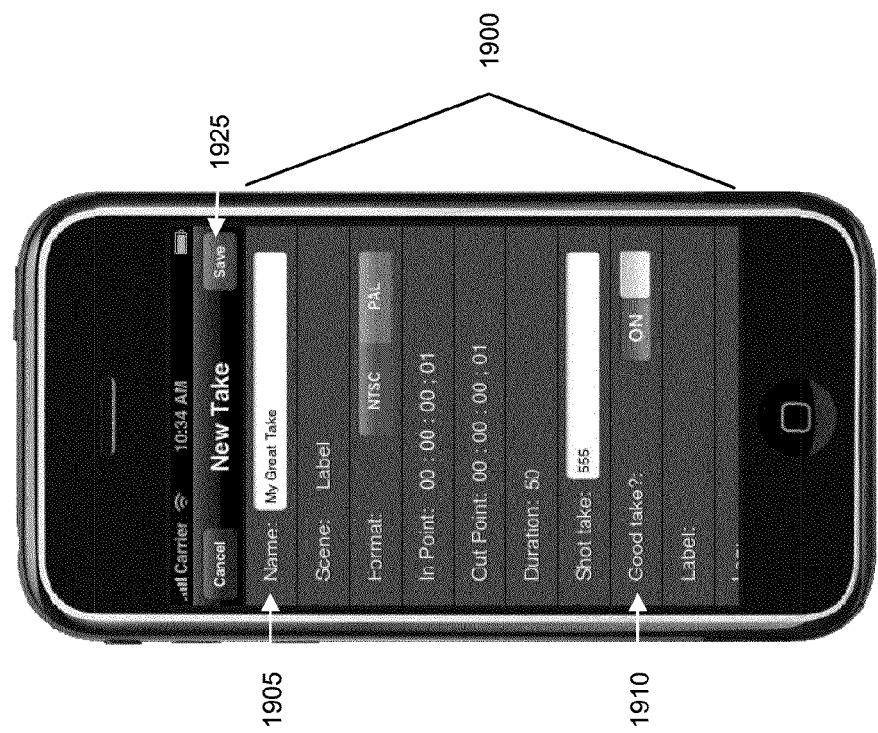

FIGS. 19A-B illustrate a new take screen 1900 of some embodiments. In some embodiments, a user selecting the new take button 1815 brings up the new take screen 1900. The new take screen allows a user to input information about an upcoming take. The new take screen includes various information about the created new take. Generally, the new take screen displays information about a take that is about to be filmed. The new take screen allows a user to name a take with name field 1905. Good take button 1910 allows a user to determine whether or not a screen will come up following a take asking the user whether or not the take is a good take. The comments section 1915 allows for comments about the take (e.g., director's comments) to be entered. The cancel button 1920 of some embodiments allows a user to cancel the new take and returns the user to the takes menu 1800. The save button 1925 of some embodiments saves the take information about the newly created take.

Figure 21:
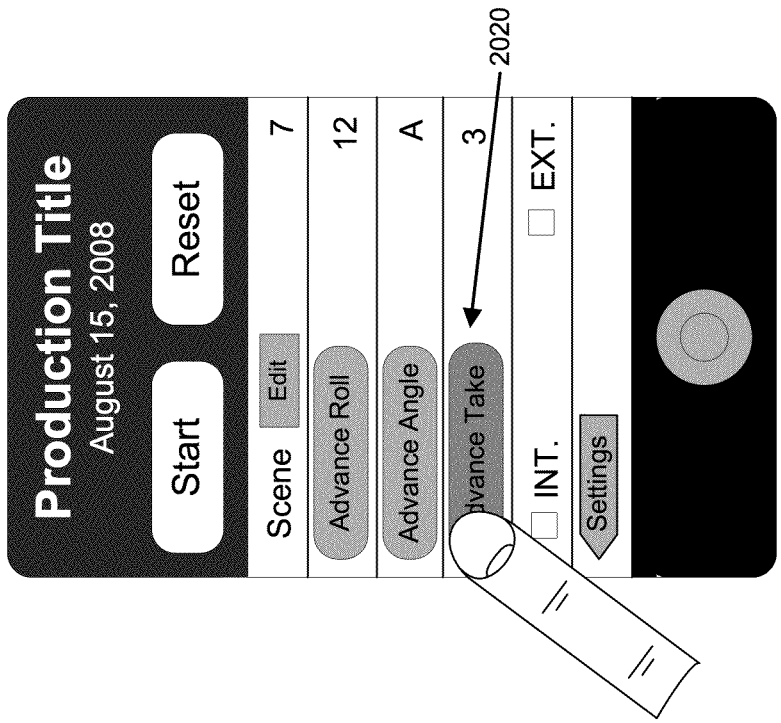
FIGS. 20-22 illustrate a user manipulating a menu of the some embodiments of a digital slate through a touchscreen.
Figure 20:
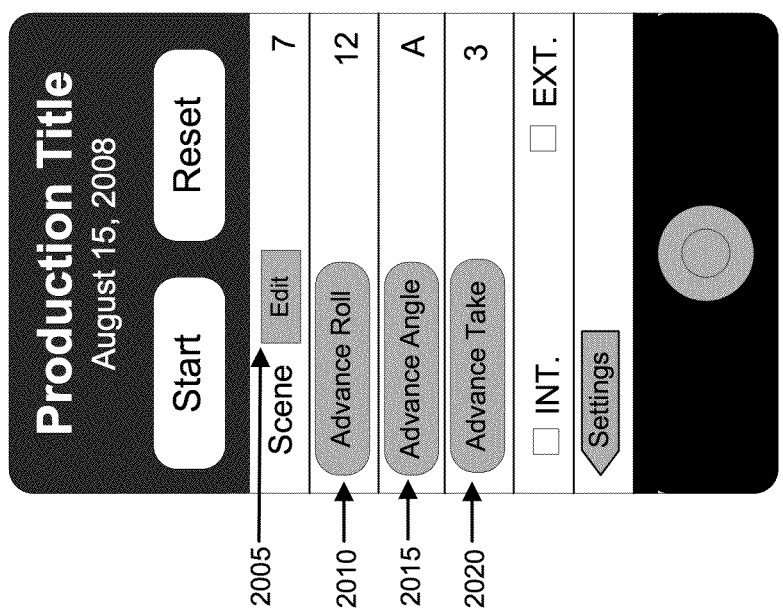
Figure 22:
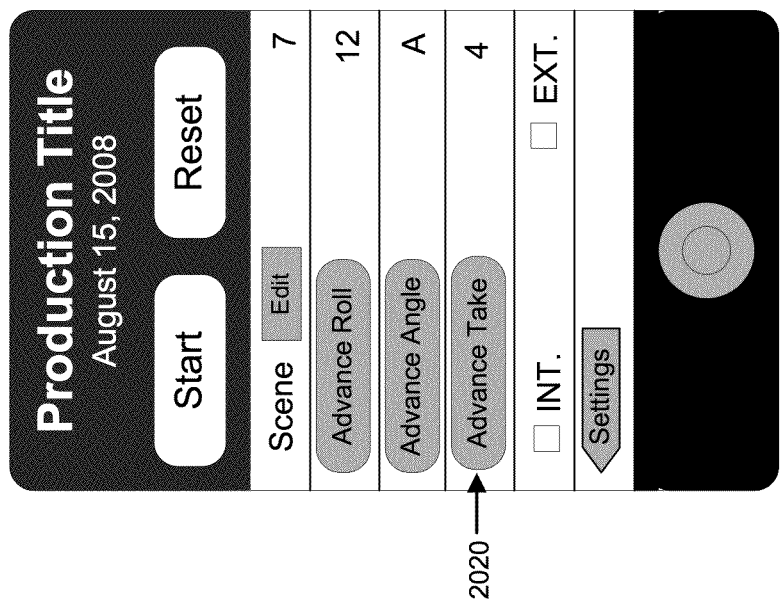

FIGS. 20-22 illustrate a screen 2000 from which a user can begin the display of metadata on the digital slate (as described above with reference to FIGS. 4-13). The screen 2000 includes a scene edit button 2005, an advance roll button 2010, an advance angle button 2015, and an advance take button 2020. The advance roll button 2010 and advance take button 2020 increase the number of the camera roll and take, respectively. The advance angle (also called advance shot in some embodiments) button adds an alphabetical character to the scene number to indicate that the camera point-of-view has been changed in some way (e.g., physically moving the camera, changing the lens of the camera, etc.). Screen 2000 also includes a start button 2025. Selecting start button 2025 starts the display of metadata on the digital slate in some embodiments.

FIG. 21 illustrates a user touching advance take button 2020. In this figure, the advance take button 2020 has turned darker as the user touches it. In some embodiments, a selected button turns lighter to indicate a selection. Other embodiments make other visual changes, or do nothing at all, to indicate a selection. FIG. 22 indicates the result of the user pressing the advance take button 2020, which is that the take number has increased from three to four. The advance take functionality is especially useful when filming multiple takes in a row. Accordingly, the screen 2000 is displayed automatically after the filming of a take in some embodiments.

Figure 23:
FIG. 23 illustrates a screen of some embodiments allowing a user to select whether a take is good or bad.

In some embodiments, a user can also enter information about a particular take after the take is filmed. Immediately after a take is finished filming, the digital slate of some embodiments brings up the screen illustrated in FIG. 23. FIG. 23 illustrates digital slate 2300 presenting two options, a good take option 2305 and a bad take option 2310. A user selecting bad take option 2310 indicates that the take did not actually occur. Often the director, actors, etc. will be set up for a take but something will prevent the take from happening (e.g., a camera is malfunctioning, etc.). Accordingly, when the user selects bad take option 2310, the digital slate does not store the metadata about the take in a data storage structure (described below in Section III). When the user selects good take option 2305, this indicates that the take did actually occur. Accordingly, the digital slate stores the metadata for the take in the data storage structure.

Figure 24:
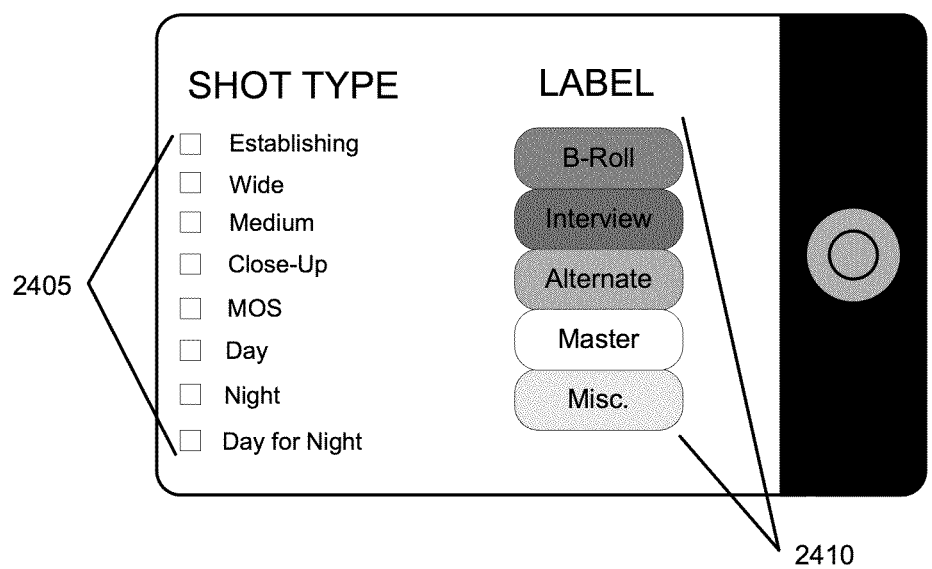
FIG. 24 illustrates a screen of some embodiments that is displayed when a user selects that a take is good.

Selecting the good take option 2305 also brings up the screen 2400 illustrated in FIG. 24 in some embodiments. The screen 2400 allows the user to enter information about the type of shot that was filmed in the take (e.g., establishing, wide, close-up, etc.). As shown, some embodiments use checkboxes 2405 to allow a user to select one or more attributes of the shot. For example, a user could select that the shot is an establishing shot filmed during the day by selecting the "Establishing" checkbox and the "Day" checkbox.

The screen 2400 also includes the label options 2410: B-Roll, Interview, Alternate, Master, and Misc. The options 2410 allow the user to indicate a set of takes in which to classify the most recent take. In some embodiments, after the user enters this information, the digital slate proceeds to provide the screen shown in FIG. 20, allowing the user to easily advance the take if another take will be filmed soon.

C. Camera Angle

Some embodiments of the invention provide a method for determining the angle of a camera during an effects shot. In addition to the metadata that is input for all takes (scene number, take number, etc.), when the take is for an effects shot the angle of the camera is also stored. Embodiments of the digital slate that include tilt-detecting circuitry (e.g., an accelerometer) can determine the angle at which the device is held. As video cameras used in the film industry generally have a flat panel on top of the camera that is aligned with the top of the lens (which will be the horizon line on the video filmed with the camera), a device placed on the top of the camera will be at the same angle as the camera in relation to the ground.

Figure 25:
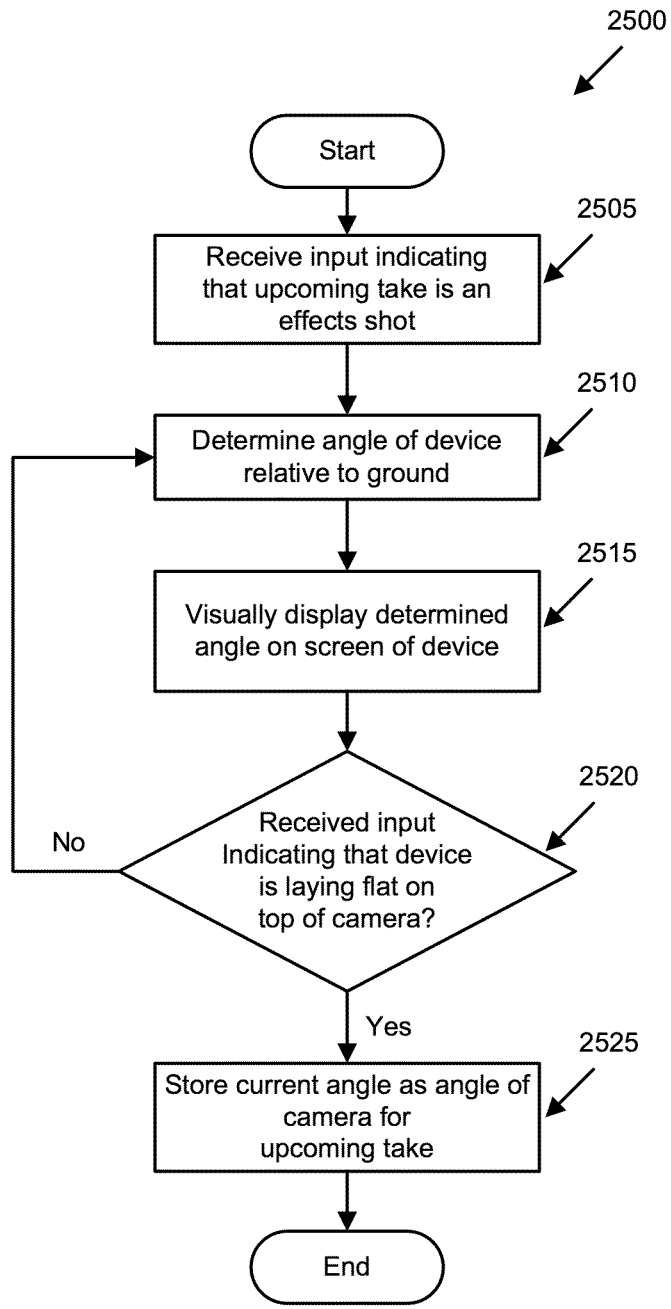
FIG. 25 conceptually illustrates a process of some embodiments for determining the camera angle of an effects shot.

FIG. 25 conceptually illustrates a process 2500 of some embodiments for determining the camera angle of an effects shot. The process is performed by a digital slate in some embodiments. The process 2500 begins at 2505 when it receives input indicating that an upcoming take is an effects shot. In some embodiments, this is an option that can be selected by a user in a menu such as the new take menu 1900 of FIGS. 19A and 19B. In some embodiments, a user selects the camera angle option 1725 shown in FIG. 17 in order to indicate that a take is for an effects shot. If a previous take for a particular scene is an effects shot, then in some embodiments the next take for the particular scene is classified as an effects shot by default.

The process 2500 then determines (at 2510) the angle of the device relative to the ground. As mentioned above, tilt detection circuitry in the device, such as an accelerometer, can be used to determine the angle of the device relative to the ground. An accelerometer of some embodiments can recognize the direction of the earth's gravitational field and, from this, determine the angle of the device.

Figure 26:
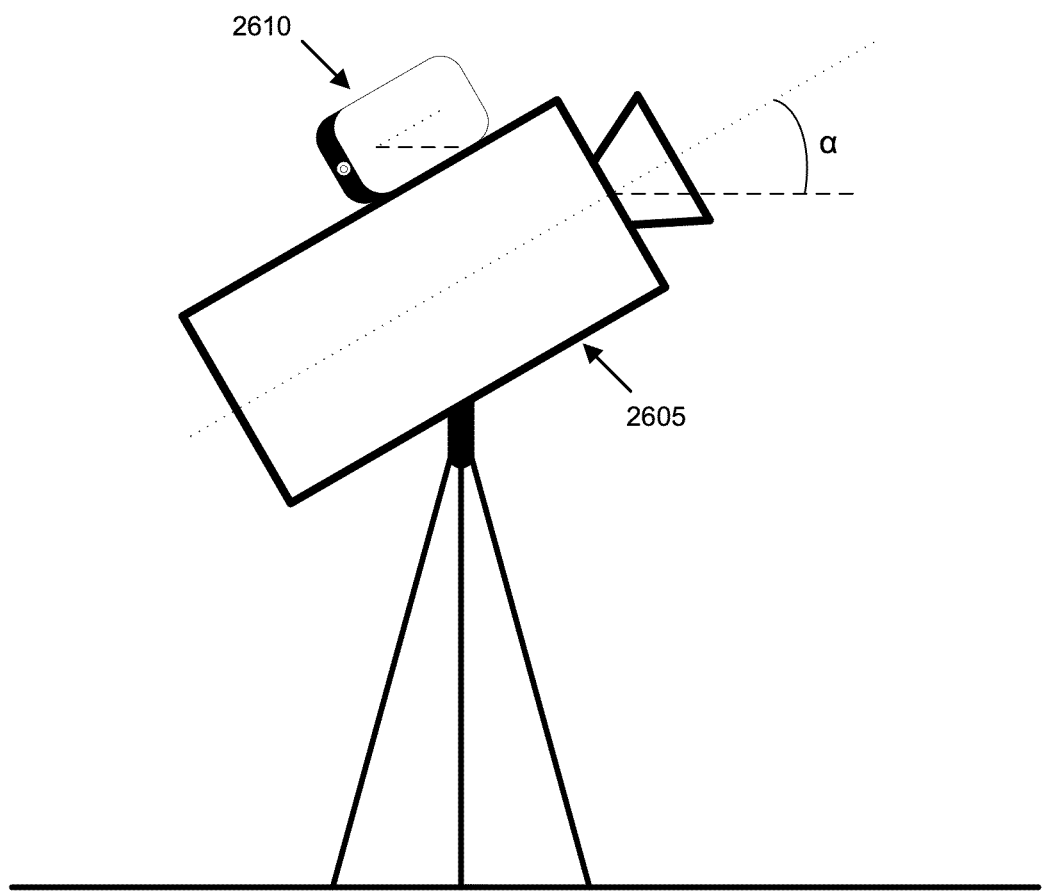
FIG. 26 illustrates a side view of a camera and a digital slate device of some embodiments.

FIG. 26 illustrates a side view of a camera 2605 and a digital slate device 2610 of some embodiments. The camera 2605 is tilted backwards at an angle α relative to the ground. Device 2610 is positioned atop the flat top surface of camera 2605, such that the accelerometer in device 2610 can determine the angle α. In some embodiments, the device must be held on the camera. Because the angle being measured in the illustrated embodiment is the forward or backward tilt of the camera, it is not an issue if the digital slate device 2610 is not aligned perfectly perpendicularly to the top surface of the camera. In some embodiments, the device sits flat on the top of the camera, such that the display of the device is parallel to the top of the camera.

The process 2500, in some embodiments, then visually displays (at 2515) the determined angle on the screen of the device. Different embodiments display the determined angle in different ways. Some embodiments display the angle (in degrees or radians) in large numbers on the screen of the device. Other embodiments display the angle graphically.

Figure 27:
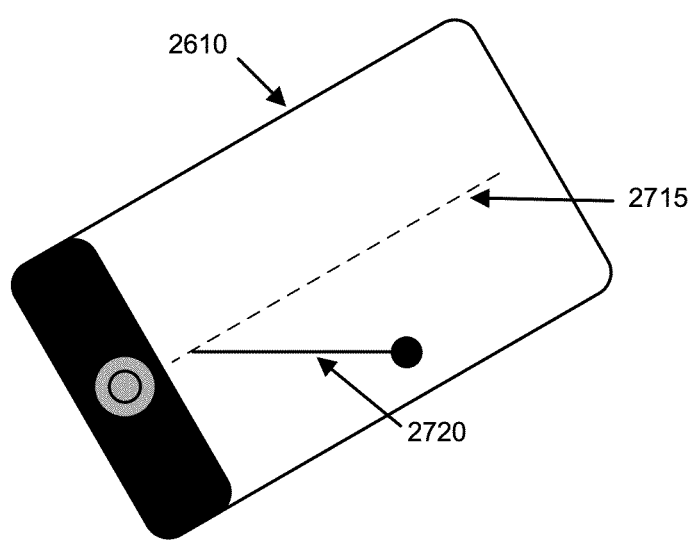
FIG. 27 illustrates a close-up of the digital slate of FIG. 26.

FIG. 27 illustrates a close-up view of the device 2610 shown in FIG. 26 as it sits atop the flat surface of camera 2605. The screen of the device 2610 displays a constant line 2715 indicating horizontal in the frame of reference of the device. The screen also displays a second line 2720 that moves on the screen so as to stay horizontal in the frame of reference of the earth's gravitational field. In FIG. 27, the angle between the first line 2715 and the second line 2720 is α (the angle the camera is tilted off of the horizontal). Other embodiments use other graphical displays, such as a constant line that indicates vertical in the frame of reference of the device and a second line that moves so as to stay vertical in the frame of reference of the earth.

The process 2500 then determines (at 2520) whether it has received input indicating that the device is aligned on top of the camera. For example, in some embodiments, a user must provide input via a touchscreen on the device (or another input method) that the device is situated at the angle of the camera. If the process 2500 has not received such input, then the process returns to 2510 and continues determining the angle of the device and displaying the angle on the screen.

Once the process 2500 receives input indicating that the device is properly aligned, it stores the currently determined angle as metadata associated with a particular take. Some embodiments store the camera angle, along with other metadata associated with the particular take, in a data storage structure such as an XML file. The storage of metadata is described further below in Section III.

D. Digital Slate Circuitry

Figure 28:
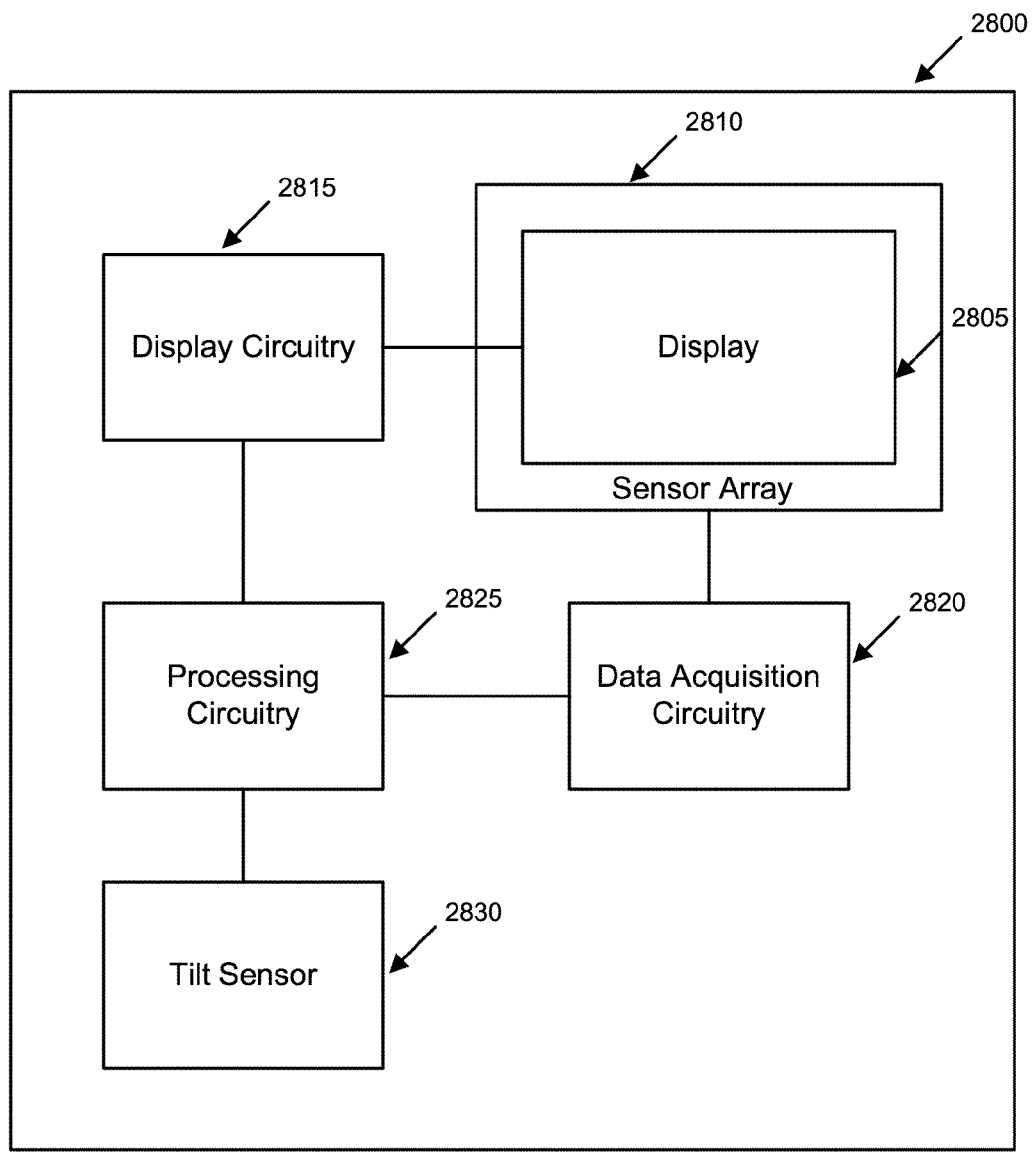
FIG. 28 conceptually illustrates the circuitry of a digital slate of some embodiments.

FIG. 28 conceptually illustrates the circuitry of a digital slate 2800 of some embodiments. Digital slate 2800 includes a display 2805, a sensor array 2810, display circuitry 2815, data acquisition circuitry 2820, processing circuitry 2825, and a tilt sensor 2830. Some embodiments of the digital slate include other circuitry in addition to that illustrated in digital slate 2800. For example, some embodiments include wireless communications circuitry such as cellular telephone circuitry, Bluetooth connection circuitry, etc. In addition, some embodiments of the digital slate do not have all of the circuitry shown in FIG. 28. For example, some embodiments of the digital slate do not include tilt sensor 2830 and/or sensor array 2810.

In some embodiments, sensor array 2810 is used to identify touch input from a user. A user affects one or more sensors in the sensor array by touching the display 2805 in some embodiments. The sensor array 2810 is connected to data acquisition circuitry 2820. When a user touches the sensor array, this data is sent to the data acquisition circuitry 2820. The data acquisition circuitry 2820 determines the location on the screen that was touched and forwards this touch data to the processing circuitry 2825. Some embodiments report this data as a set of (x,y) coordinates.

Display 2805 displays options to a user so that a user can make selections to input metadata in some embodiments. The display 2805 of some embodiments also displays metadata about a film project in some embodiments. Display circuitry 2815 connects to the display 2805. Processing circuitry 2825 controls the output of display 2805 through the display circuitry 2815. For example, if a user makes a touchscreen selection through the sensor array 2810, the processing circuitry 2825 determines what selection has been made using data from the data acquisition circuitry 2820, then determines what should be displayed and sends this information to the display circuitry 2815. The processing circuitry of some embodiments includes one or more memories for storing information associated with the display and data acquisition circuitry, as well as other information (e.g., metadata).

The tilt sensor (i.e., tilt-detecting circuit) 2830 of some embodiments determines the angle at which the digital slate is being held relative to the ground. In some embodiments, the tilt sensor 2830 is a binary device (e.g. a mercury switch) that is either tilted or not tilted. In other embodiments, the tilt sensor 2830 is an accelerometer that determines the exact angle at which the digital slate device is being held relative to the earth's gravitational field. Tilt information from the tilt sensor 2830 is sent to the processing circuitry 2825 for analysis. For example, in some embodiments the tilt sensor is used to determine the angle of a camera.

III. Storage of Metadata

As mentioned above, some embodiments store metadata pertaining to one or more video clips (e.g., takes) in a data storage structure. After receiving all the metadata for a particular take (from both the user and the camera), the digital slate of some embodiments stores the received metadata about the particular take in the storage structure. Some embodiments wait until all takes are finished for a particular time period (e.g., a day) before storing the metadata for the takes in one or more storage structures. Some embodiments store metadata for numerous takes in one storage structure, while in other embodiments each take has its own storage structure.

Figure 29:
FIG. 29 illustrates an XML file of some embodiments that in which metadata is embedded.

The storage structure of some embodiments is a generic structure that can be understood by video editing tools, such as non-linear editors (e.g., Final Cut Pro). In some embodiments, the storage structure is an XML file. FIG. 29 illustrates an example of an XML file 2900 of some embodiments in which metadata about a take is embedded. FIG. 29 illustrates XML for one take. In some embodiments, the XML shown would be only one small portion of an XML file, which would include XML for numerous takes.

In file 2900, the start tag 2905 ("<clip id=RunningTrees">") indicates that all the information up to the end tag 2910 ("</clip>") is metadata about the particular clip. Various metadata is embedded in the XML file 2900. Included in this metadata is timecode information, which is embedded between the start tag 2915 ("<timecode>") and the end tag 2920 ("</timecode>"). The timecode information includes a string field 2925, which indicates the starting timecode for the take. The duration field 2930, above the timecode section, indicates the duration of the take. Some embodiments include more information than is shown in XML file 2900, such as fields for the director's name, the scene number and project name, etc. Some embodiments, rather than timecode information, embed a file name for the particular clip.

IV. Video Editing Application

A. Merging the Metadata with Content

In some embodiments, the metadata embedded in a storage structure is automatically merged with the content that it describes. This is performed by a non-linear editor in some embodiments. The storage structure that holds the metadata is initially stored on the digital slate device. As described above, some embodiments of the digital slate device can communicate wirelessly via cellular telephone or other wireless connections. As such, a user of a digital slate device can e-mail the storage structure to either another person (such as an assistant editor for a film) or to themselves. The recipient of the e-mail can then access the storage structure with the relevant metadata on another device, such as a computer with a non-linear editor.

Figure 30:
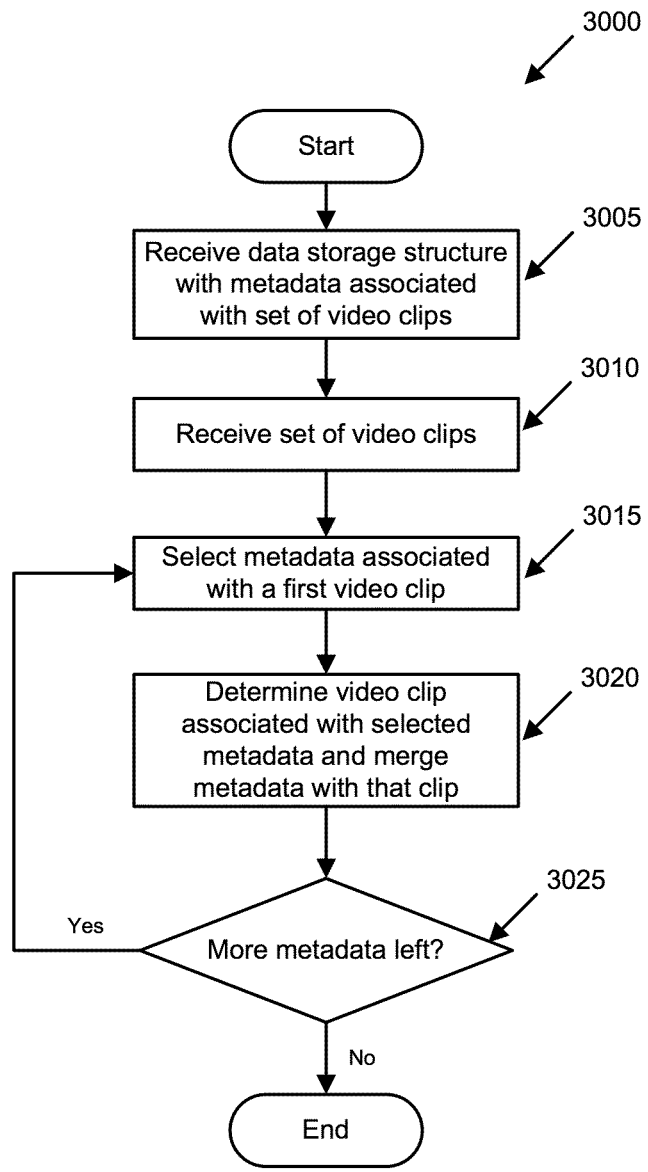
FIG. 30 illustrates a process of some embodiments for automatically merging metadata with video clips.

FIG. 30 illustrates a process 3000 of some embodiments for automatically merging metadata with video clips. Process 3000 is performed by a non-linear editor in some embodiments. The process 3000 starts at 3005 when it receives a data storage structure including metadata that is associated with a set of video clips. In some embodiments, the data storage structure is an XML file such as is described above in some embodiments. Some embodiments receive multiple data storage structures including metadata associated with the set of video clips. The process then receives (at 3010) the set of video clips. These may be stored on a digital tape or may come from a hard drive of a video camera, or may be received by other means.

At 3015, the process selects metadata associated with a first video clip. The process selects the metadata for a clip based on how the metadata is arranged in the storage structure. For example, if the storage structure is an XML file such as is described above, the process finds the first "<clip>" tag in the XML file, and selects the metadata from that tag to the first "</clip>" tag. Other embodiments using different tags select metadata for a clip accordingly.

The process 3000 then determines (at 3020) which video clip is associated with the selected metadata. Different methods are used to make this determination. As mentioned above, if the video camera that filmed the video clips uses a digital tape to store its content, then the metadata for a particular clip includes a starting and ending timecode for the clip in some embodiments. Accordingly, the process 3000 uses timecode data extracted from the metadata, and matches this with the timecode on the digital tape. The selected metadata is then associated with the video content having the extracted timecode.

If the video camera that filmed the video clips uses a hard disk to store the video content, then the metadata for a particular clip includes a file name for the clip in some embodiments. Accordingly, the process 3000 extracts this file name from the metadata and finds the video clip with the extracted file name. The selected metadata is then associated with the video clip having the extracted file name. Other embodiments match the metadata with video clips differently.

The process 3000 then determines (at 3025) whether any metadata is left to match with video clips. If more metadata remains in the storage structure(s), the process returns to 3015, selects another set of metadata, and repeats 3020. If no more metadata remains, the process ends.

Figure 31:
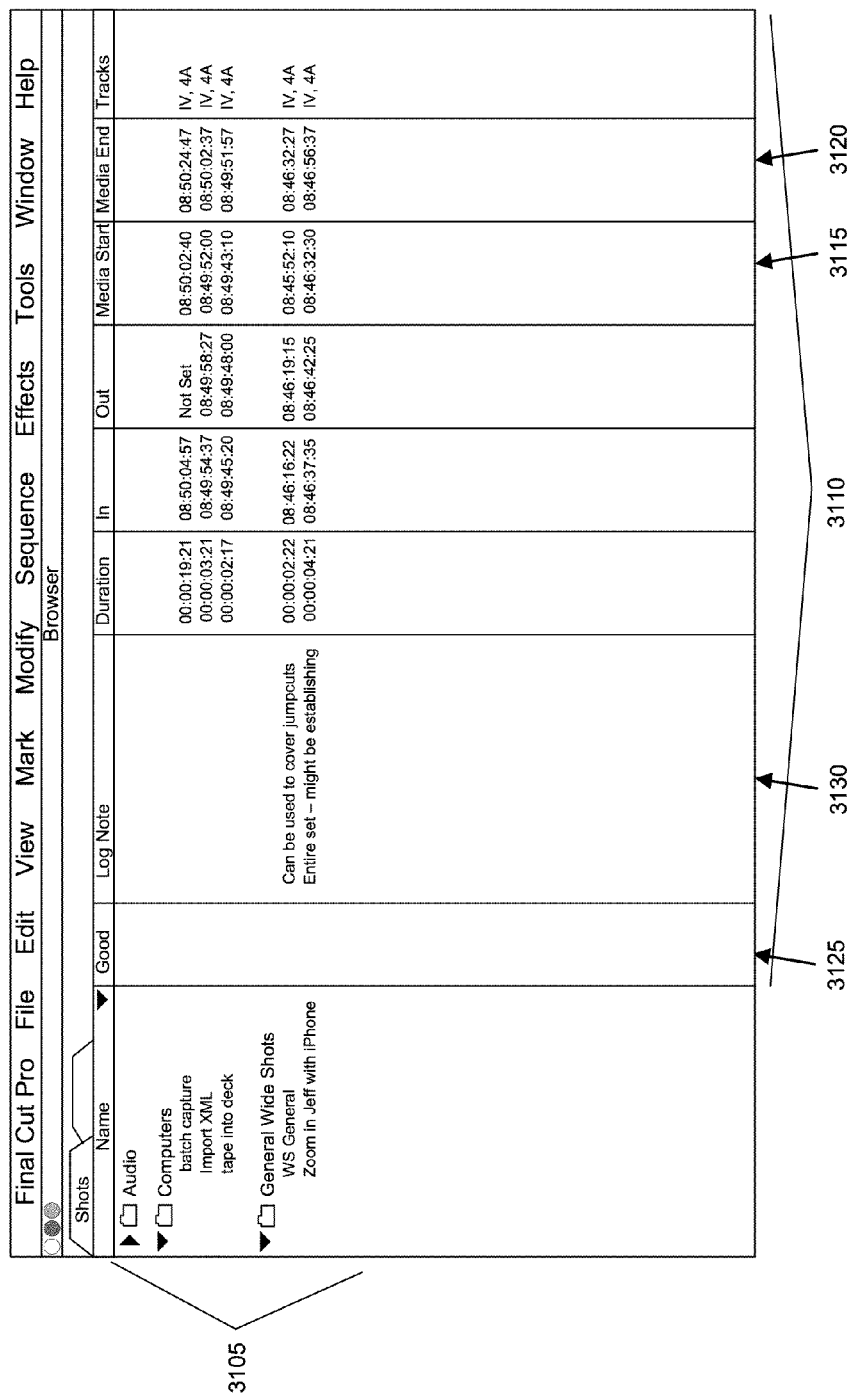
FIG. 31 illustrates an example of a screen from a non-linear editor that has automatically merged metadata with video content in accordance with some embodiments.

FIG. 31 illustrates an example of a screen from a nonlinear editor that has automatically merged metadata with video content. FIG. 31 shows different video clips 3105 and associated metadata 3110. Metadata 3110 includes the timecode start and end points in columns 3115 and 3120, which are used by the nonlinear editor of some embodiments to associate the metadata 3110 to the video clips 3105. Metadata 3110 also includes such information as whether a video clip was marked as a good take (column 3125) and any notes about the take (column 3130).

Figure 32:
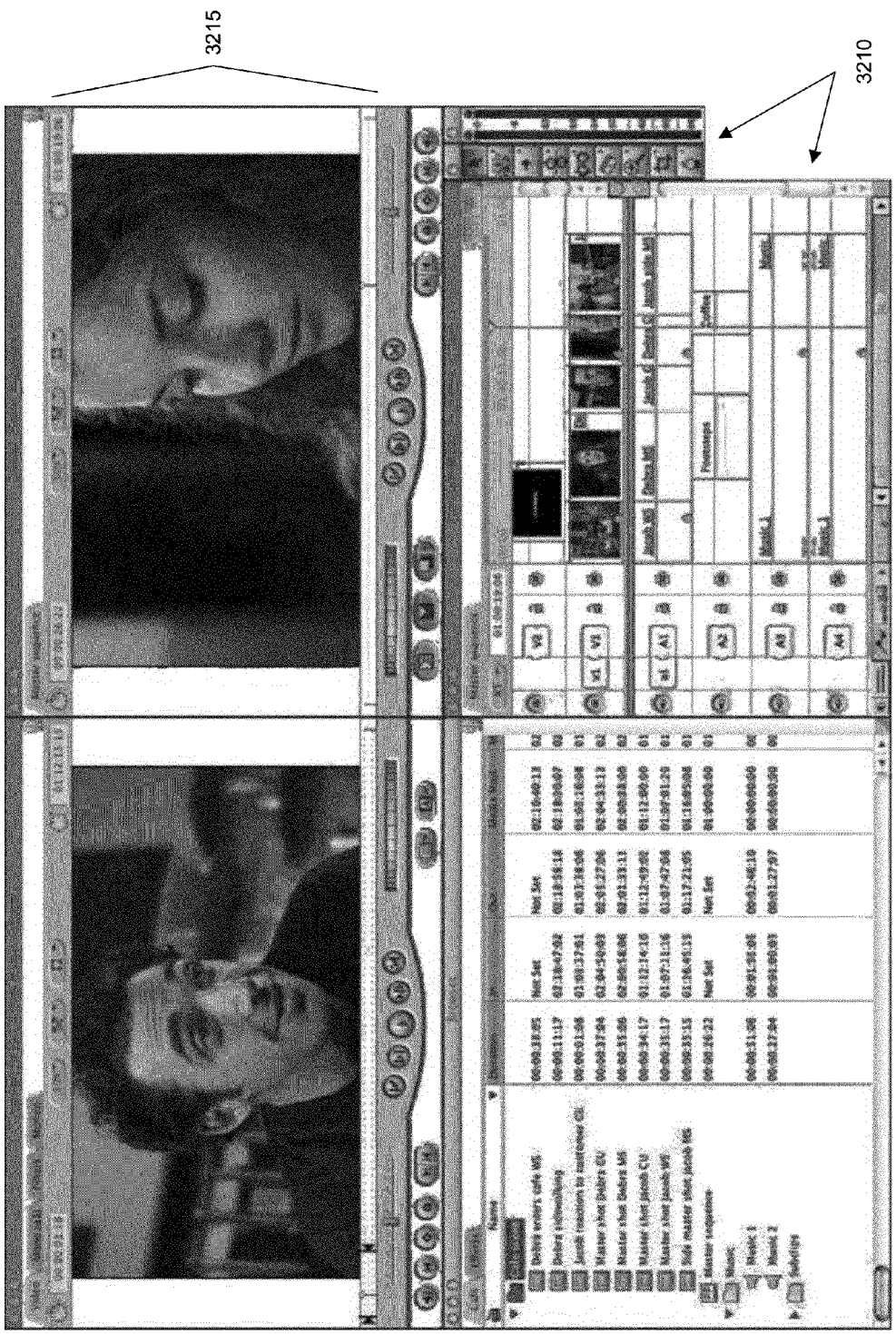
FIG. 32 illustrates an example of a screen from a non-linear editor that can be used to edit video in accordance with some embodiments.

FIG. 32 illustrates an example of a screen 3200 from a video editing application of some embodiments that is used to edit video and audio after importing the video and audio. FIG. 32 illustrates a list of video clips 3205, video editing tools 3210, and video displays 3215. The list of video clips 3205 is a smaller version of the screen illustrated in FIG. 31, including the video clips along with metadata (e.g., timecode information) about the video clips. The video editing tools 3210 include tools such as timelines that allow a user to graphically set in and out points for video clips (in other words, where in the final product a specific clip or part of a clip will be shown). In some embodiments, video editing tools 3210 also give users the ability to edit in effects in some embodiments or perform other video editing functions. Video displays 3215 allow a user to watch multiple video clips at once, thereby enabling easier selection of in and out points for the video clips. Some embodiments display other numbers (e.g., one, or three or more) of video clips.

B. Software Architecture of Video Editing Application

Figure 33:
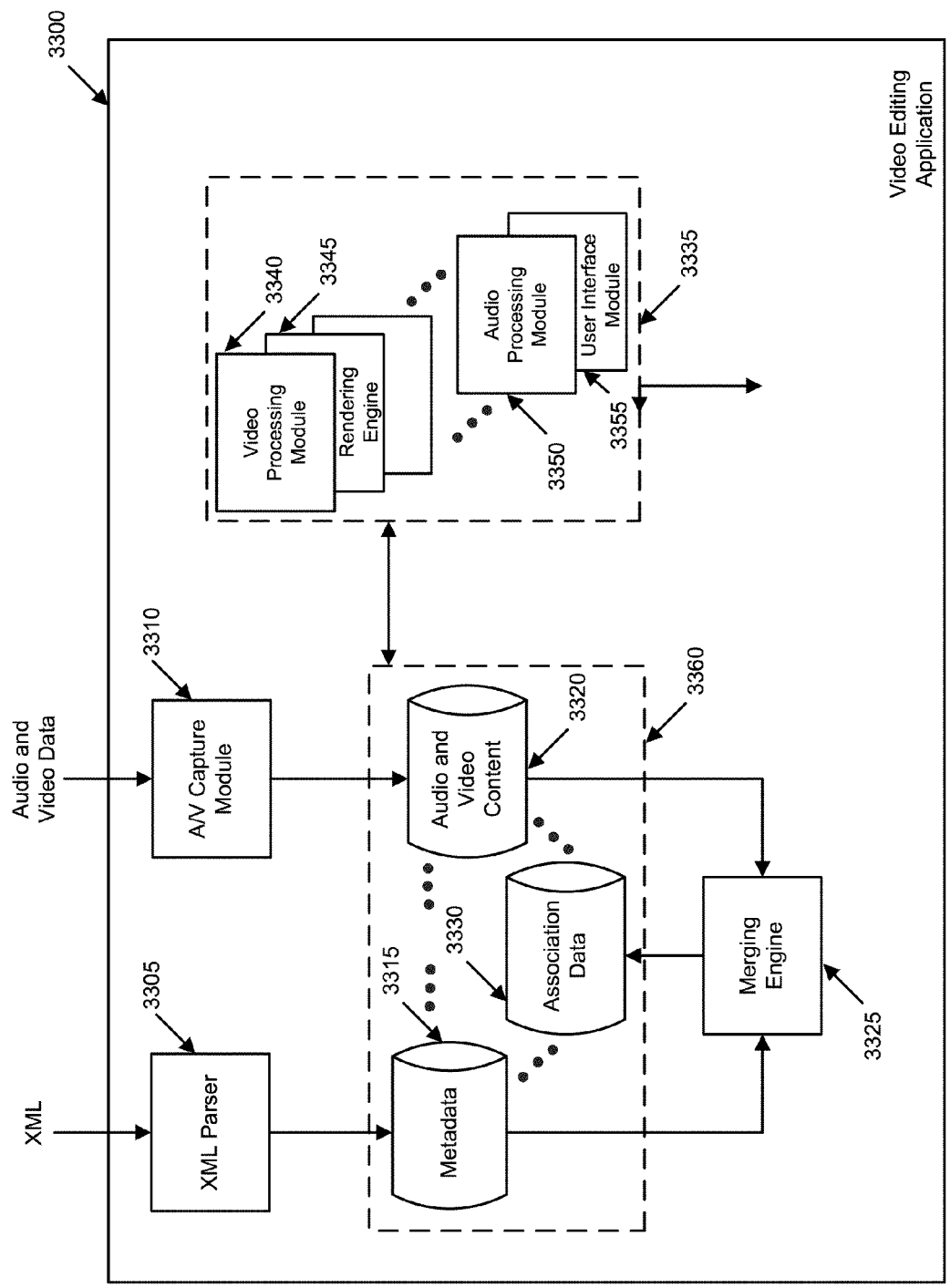
FIG. 33 conceptually illustrates the software architecture of a video editing application of some embodiments.

FIG. 33 conceptually illustrates a video editing application 3300 of some embodiments. The video editing application 3300 includes XML parser 3305, A/V capture module 3310, merging engine 3325, a set of modules 3335, and a set of storages 3355. The set of modules 3335 includes a video processing module 3340, a rendering engine 3345, and an audio processing module 3350, in addition to other modules. The set of storages includes storages 3315, 3320, and 3330, which store metadata, audio/video content, and association data, respectively. The set of storages 3355 includes other storages as well in some embodiments.

The XML parser 3305 receives XML files that include metadata. In some embodiments, the XML parser 3305 automatically parses the XML to extract the metadata and stores the metadata in storage 3315. This metadata includes timecode and/or other identifying information (e.g., file names) in some embodiments. The A/V capture module 3310 receives audio and/or video data from an outside source (e.g., a digital tape, a digital video camera hard disk, etc.) and stores the audio and/or video content in storage 3320.

The merging engine 3325 receives metadata from storage 3315 and audio and/or video content from storage 3320, and matches the metadata to the video and/or audio content that it describes. As described above, in some embodiments, the merging engine uses timecode, file names, or other identifying information in the metadata to match the metadata with the appropriate content. This process is performed automatically by some embodiments. The merging engine stores association data in storage 3330 that indicates to which content the metadata is matched.

The set of modules 3335 includes video and audio processing modules 3340 and 3350 which allow users to edit video and audio (e.g., adding in effects, setting in and out points, etc.). The set of modules 3335 also includes rendering engine 3345, which allows for playback of the video and audio. The set of modules 3335 includes a user interface module 3355 that receives user interactions (e.g., video editing) through a user interface such as that shown in FIG.

32. The set of modules 3335 also includes various other modules in some embodiments.

The set of modules 3335 can access any of the storages in the set of storages 3355. For example, if the merging engine fails to merge the data, a user can manually associate the metadata from storage 3315 with the content from storage 3320. Some embodiments do not include a merging engine 3325, and therefore all associations must be created manually through user interaction. Similarly, in some instances a user will want to see the metadata without association data, so the set of modules 3335 can access storage 3315 and display only the metadata.

While many of the features have been described as being performed by one module (e.g., the merging engine 3325), one of ordinary skill would recognize that the functions might be split up into multiple modules, and the performance of one feature might even require multiple modules. Furthermore, one of ordinary skill would recognize that storages 3315, 3320, 3330 need not all be separate storages, and that, in some embodiments, the metadata could be stored in the same storage as the association data (or other combinations of data storage). In some embodiments, all of the storages in the set of storages 3355 are actually one storage.

V. Use of Multiple Slates

Some embodiments use multiple digital slates that can communicate with each other wirelessly (e.g., via Bluetooth or other short-range wireless connections, or via longer-range connections such as cellular communications).

In some situations, multiple cameras film a scene at the same time. For example, one camera might be shooting a wide shot looking down at a conversation from above while second and third cameras each film close-up shots of members of the conversation. In such an instance, each camera is considered to be filming a different scene (often the different scenes share a scene number and each camera is assigned a different letter).

When multiple cameras are filming a scene at the same time, a digital slate is assigned to each camera in some embodiments. One master slate (often kept by the script supervisor) is used to populate the other slave slates with metadata about the take being filmed. The user of the master slate can input all of the metadata that is the same for all cameras (e.g., director and cameraperson name, take number, any post-take comments, etc.). This information is then transmitted to the other slates so that the information need not be input multiple times. This also eliminates the chances of one of other users inputting incorrect information. The users of the dummy slates input the information specific to that slate (e.g., scene number, camera information).

Multiple digital slates can also be used to update a master slate. For example, in some embodiments, the script supervisor uses the master slate and the camera person and sound recordist are each given a separate slave slate. If camera information for a take needs to be input, then the cameraperson can fill out the information on their slate and transmit this information to the master slate. Similarly, the sound recordist can fill out any audio-related information (e.g., if a noise interrupts the take).

VI. Computer System

Figure 34:
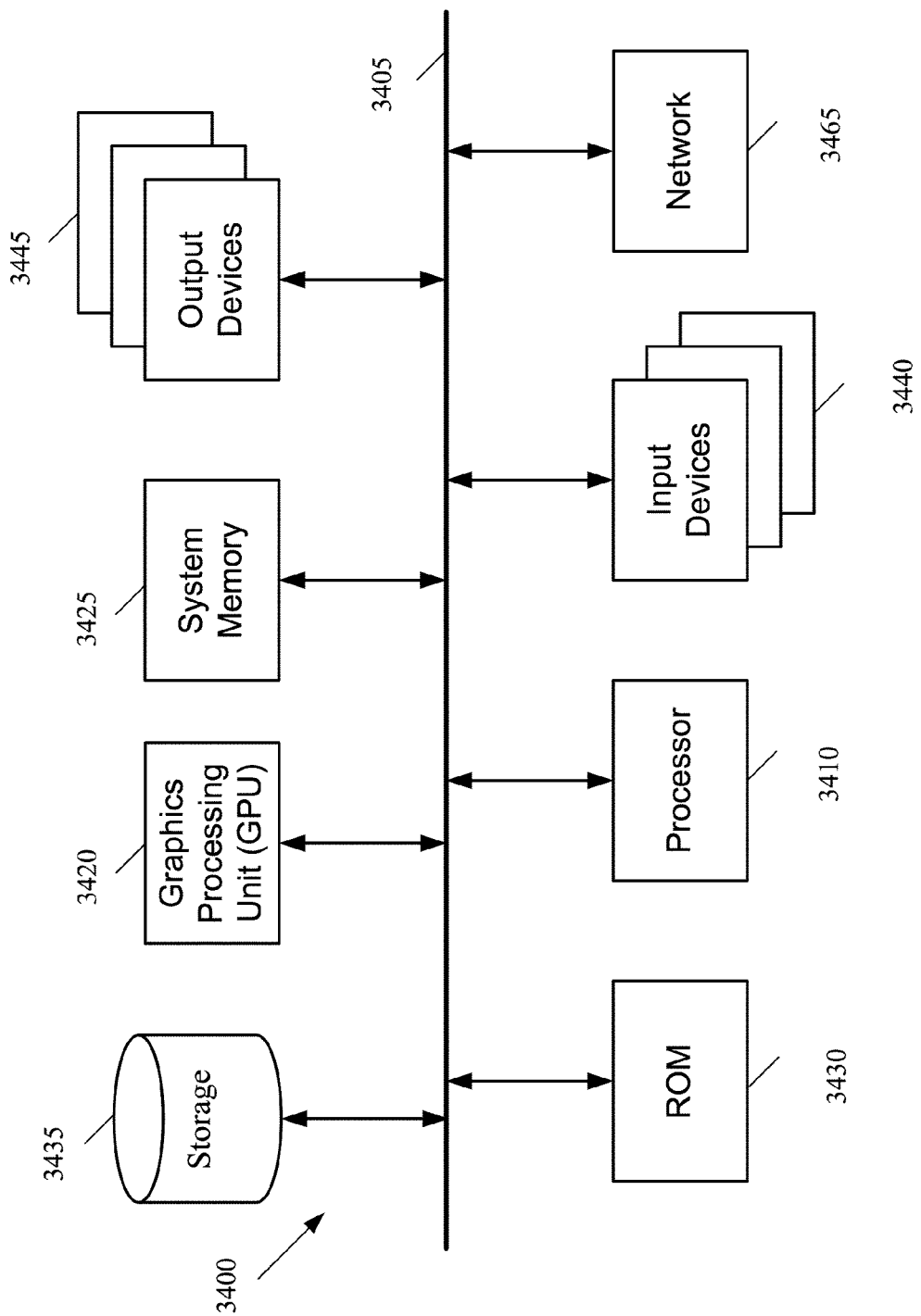
FIG. 34 conceptually illustrates a computer system with which some embodiments of the invention are implemented.

Computer programs for implementing some embodiments are executed on computer systems. FIG. 34 illustrates a computer system with which some embodiments of the invention are implemented. Such a computer system includes various types of computer readable media and interfaces for various other types of computer readable media. Computer system 3400 includes a bus 3405, a processor 3410, a graphics processing unit (GPU) 3420, a system memory 3425, a read-only memory 3430, a permanent storage device 3435, input devices 3440, and output devices 3445.

The bus 3405 collectively represents all system, peripheral, and chipset buses that communicatively connect the numerous internal devices of the computer system 3400. For instance, the bus 3405 communicatively connects the processor 3410 with the read-only memory 3430, the GPU 3420, the system memory 3425, and the permanent storage device 3435.

From these various memory units, the processor 3410 retrieves instructions to execute and data to process in order to execute the processes of the invention. Some instructions are passed to and executed by the GPU 3420. The GPU 3420 can offload various computations or complement the image processing provided by the processor 3410. In some embodiments, such functionality can be provided using CoreImage's kernel shading language.

The read-only-memory (ROM) 3430 stores static data and instructions that are needed by the processor 3410 and other modules of the computer system. The permanent storage device 3435, on the other hand, is a read-and-write memory device. This device is a non-volatile memory unit that stores instructions and data even when the computer system 3400 is off. Some embodiments of the invention use a mass-storage device (such as a magnetic or optical disk and its corresponding disk drive) as the permanent storage device 3435.

Other embodiments use a removable storage device (such as a floppy disk, flash drive, or ZIP® disk, and its corresponding disk drive) as the permanent storage device. Like the permanent storage device 3435, the system memory 3425 is a read-and-write memory device. However, unlike storage device 3435, the system memory is a volatile read-and-write memory, such a random access memory. The system memory stores some of the instructions and data that the processor needs at runtime. In some embodiments, the invention's processes are stored in the system memory 3425, the permanent storage device 3435, and/or the read-only memory 3430.

The bus 3405 also connects to the input and output devices 3440 and 3445. The input devices enable the user to communicate information and select commands to the computer system. The input devices 3440 include alphanumeric keyboards and pointing devices (also called "cursor control devices"). The output devices 3445 display images generated by the computer system. For instance, these devices display a GUI. The output devices include printers and display devices, such as cathode ray tubes (CRT) or liquid crystal displays (LCD).

Finally, as shown in FIG. 34, bus 3405 also couples computer 3400 to a network 3465 through a network adapter (not shown). In this manner, the computer can be a part of a network of computers (such as a local area network ("LAN"), a wide area network ("WAN"), or an Intranet, or a network of networks, such as the internet. For example, the computer 3400 may be coupled to a web server (network 3465) so that a web browser executing on the computer 3400 can interact with the web server as a user interacts with a GUI that operates in the web browser.

Any or all components of computer system 3400 may be used in conjunction with the invention. For instance, in some embodiments the execution of the frames of the rendering is performed by the GPU 3420 instead of the CPU 3410. Similarly, other image editing functions can be offloaded to the GPU 3420 where they are executed before the results are passed back into memory or the processor 3410. However, a common limitation of the GPU 3420 is the number of instructions that the GPU 3420 is able to store and process at any given time. Therefore, some embodiments adapt instructions for implementing processes so that these processes fit onto the instruction buffer of the GPU 3420 for execution locally on the GPU 3420. Additionally, some GPUs 3420 do not contain sufficient processing resources to execute the processes of some embodiments and therefore the CPU 3410 executes the instructions. One of ordinary skill in the art would appreciate that any other system configuration may also be used in conjunction with the present invention.

As mentioned above, the computer system 3400 may include any one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, and floppy disks.

While the invention has been described with reference to numerous specific details, one of ordinary skill in the art will recognize that the invention can be embodied in other specific forms without departing from the spirit of the invention. For example, the digital slate of some embodiments is a handheld device that includes different circuitry than is described above, or is not a handheld device at all. Some embodiments include only some of the features described above; for example, some embodiments capture metadata and transmit that metadata for merging with video content in a non-linear editor, but do not display the metadata as a digital slate. Thus, one of ordinary skill in the art would understand that the invention is not to be limited by the foregoing illustrative details, but rather is to be defined by the appended claims.

We claim:

1. For a video editing application, a method for merging metadata with a set of video clips captured on a video camera, the method comprising:
    receiving a set of metadata from a handheld device that is a separate device from the video camera, the metadata pertaining to the set of video clips and at least partially generated by the handheld device;
    receiving the set of video clips from the video camera;
    identifying a subset of the metadata as pertaining to a single video clip, the subset of metadata comprising (i) metadata generated by the handheld device prior to the camera capturing the video clip, (ii) metadata generated by the camera and transmitted to the handheld device during the capturing of the video clip, and (iii) metadata generated by the handheld device after the capturing of the video clip by the camera is completed;
    identifying a particular video clip from the set of video clips as being the single video clip to which the subset of metadata pertains; and
    creating an association between the subset of the metadata generated by the handheld device and the particular video clip.

2. The method of claim 1, wherein identifying the particular video clip as being the single video clip to which the subset of metadata pertains comprises:
    extracting timecode information from the subset of metadata; and
    identifying the particular video clip based on the extracted timecode information.

3. The method of claim 2, wherein the set of video clips are received from a digital tape of the video camera.

4. The method of claim 1, wherein identifying the particular video clip as being the single video clip to which the subset of metadata pertains comprises:
    extracting a file name from the subset of metadata; and
    identifying the particular video clip based on the extracted file name.

5. The method of claim 4, wherein the set of video clips are received from a hard disk of the video camera.

6. The method of claim 1, wherein the set of metadata is received as an XML file, the method further comprising:
    parsing the XML file to identify a plurality of subsets of metadata as pertaining to a plurality of separate video clips based on tags in the XML file that separate the plurality of subsets of metadata, each subset of metadata pertaining to a different one of the plurality of video clips;
    for each subset of metadata, identifying the separate video clip to which the subset of metadata pertains; and
    creating an association between each subset of metadata generated by the handheld device and the separate video clip to which the subset of metadata pertains.

7. The method of claim 1, wherein identifying the subset of the metadata as pertaining to a single video clip and identifying the particular video clip are performed by the video editing application without user intervention.

8. The method of claim 1, wherein the subset of the metadata generated by the handheld device comprises at least scene and take information for the particular video clip.

9. The method of claim 1, wherein:
    the metadata generated by the handheld device prior to the camera capturing the video clip comprises at least one of a take number for the video clip, a scene for the video clip, a project with which the video clip is associated, a director of the project, and camera and sound information for the video clip;
    the metadata generated by the camera during the capturing of the video comprises at least one of a timecode information and a file name for the video clip; and
    the metadata generated by the handheld device after the capturing of the video clip comprises comments regarding a quality of the take to which the metadata corresponds.

10. A non-transitory machine readable medium storing a video editing application for execution by at least one processing unit, the video editing application comprising sets of instructions for:
    receiving a set of metadata from a handheld device that is a separate device from a video camera, the metadata pertaining to the set of video clips and at least partially generated by the handheld device;
    receiving a set of video clips from the video camera;
    identifying a subset of the metadata as pertaining to a single video clip, the subset of metadata comprising (i) metadata generated by the handheld device prior to the camera capturing the video clip, (ii) metadata generated by the camera and transmitted to the handheld device during the capturing of the video clip, and (iii) metadata generated by the handheld device after the capturing of the video clip by the camera is completed;
    identifying a particular video clip from the set of video clips as being the single video clip to which the subset of metadata pertains; and
    creating an association between the subset of the metadata generated by the handheld device and the particular video clip.

11. The non-transitory machine readable medium of claim 10, wherein the set of instructions for identifying the particular video clip as being the single video clip to which the subset of metadata pertains comprises sets of instructions for:
  extracting timecode information from the subset of metadata; and
  identifying the particular video clip based on the extracted timecode information.

12. The non-transitory machine readable medium of claim 11, wherein the set of video clips are received from a digital tape of the video camera.

13. The non-transitory machine readable medium of claim 10, wherein the set of instructions for identifying the particular video clip as being the single video clip to which the subset of metadata pertains comprises sets of instructions for:
  extracting a file name from the subset of metadata; and
  identifying the particular video clip based on the extracted file name.

14. The non-transitory machine readable medium of claim 13, wherein the set of video clips are received from a hard disk of the video camera.

15. The non-transitory machine readable medium of claim 10, wherein the set of metadata is received as an XML file, wherein the video editing application further comprises sets of instructions for:
  parsing the XML file to identify a plurality of subsets of metadata as pertaining to a plurality of separate video clips based on tags in the XML file that separate the plurality of subsets of metadata, each subset of metadata pertaining to a different one of the plurality of video clips;
  for each subset of metadata, identifying the separate video clip to which the subset of metadata pertains; and
  creating an association between each subset of metadata generated by the handheld device and the separate video clip to which the subset of metadata pertains.

16. The non-transitory machine readable medium of claim 10, wherein the sets of instructions for identifying the subset of the metadata as pertaining to a single video clip and identifying the particular video clip are performed without user intervention.

17. The non-transitory machine readable medium of claim 10, wherein the subset of the metadata generated by the handheld device comprises at least scene and take information for the particular video clip.

18. An apparatus comprising:
  a set of processing units for executing sets of instructions;
  a memory for storing a video editing application for execution by at least one processing unit, the video editing application comprising sets of instructions for:
    receiving a set of metadata from a handheld device that is a separate device from a video camera, the metadata pertaining to the set of video clips and at least partially generated by the handheld device;
    receiving a set of video clips from the video camera;
    identifying a subset of the metadata as pertaining to a single video clip, the subset of metadata comprising (i) metadata generated by the handheld device prior to the camera capturing the video clip, (ii) metadata generated by the camera and transmitted to the handheld device during the capturing of the video clip, and (iii) metadata generated by the handheld device after the capturing of the video clip by the camera is completed;
    identifying a particular video clip from the set of video clips as being the single video clip to which the subset of metadata pertains; and
    creating an association between the subset of the metadata generated by the handheld device and the particular video clip.

19. The apparatus of claim 18, wherein the set of instructions for identifying the particular video clip as being the single video clip to which the subset of metadata pertains comprises sets of instructions for:
  extracting timecode information from the subset of metadata; and
  identifying the particular video clip based on the extracted timecode information.

20. The apparatus of claim 18, wherein the set of instructions for identifying the particular video clip as being the single video clip to which the subset of metadata pertains comprises sets of instructions for:
  extracting a file name from the first subset of metadata; and
  identifying the particular video clip based on the extracted file name.

21. The apparatus of claim 18, wherein the video editing application further comprises sets of instructions for:
  identifying a plurality of subsets of metadata as pertaining to a plurality of separate video clips, each subset of metadata pertaining to a different one of the plurality of video clips;
  for each subset of metadata, identifying the separate video clip to which the subset of metadata pertains; and
  creating an association between each subset of metadata received from the first handheld device and the separate video clip to which the subset of metadata pertains.

22. The apparatus of claim 18, wherein the sets of instructions for identifying the subset of the metadata as pertaining to a single video clip and identifying the particular video clip are performed without user intervention.

23. The apparatus of claim 18, wherein the subset of the metadata generated by the first handheld device comprises at least scene and take information for the particular video clip.

24. The apparatus of claim 18, wherein the handheld device is a first handheld device, wherein a second handheld device is communicatively coupled to the first handheld device, wherein the first handheld device populates the second handheld device, while the particular video clip is filmed, with said metadata generated prior to the camera capturing the particular video clip, wherein the second handheld device generates additional metadata relating to the particular video clip and transmits the additional metadata to the first handheld device for aggregation with the metadata received from the video camera and the metadata generated by the first handheld device.

* * * * *